US012075295B2

(12) United States Patent
Sharma et al.

(10) Patent No.: US 12,075,295 B2
(45) Date of Patent: Aug. 27, 2024

(54) TECHNIQUES FOR PERFORMING MEASUREMENT RELAXATION

(71) Applicant: QUALCOMM Incorporated, San Diego, CA (US)

(72) Inventors: Prashant Sharma, San Jose, CA (US); Changhwan Park, San Diego, CA (US); Chu-Hsiang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/507,132

(22) Filed: Oct. 21, 2021

(65) Prior Publication Data

US 2023/0125530 A1  Apr. 27, 2023

(51) Int. Cl.
*H04W 36/00* (2009.01)
*H04W 36/08* (2009.01)
*H04W 36/32* (2009.01)

(52) U.S. Cl.
CPC ... *H04W 36/0094* (2013.01); *H04W 36/0058* (2018.08); *H04W 36/00837* (2018.08); *H04W 36/08* (2013.01); *H04W 36/32* (2013.01)

(58) Field of Classification Search
CPC . H04W 24/08; H04W 24/10; H04W 36/0058; H04W 36/00837;
(Continued)

(56) References Cited

U.S. PATENT DOCUMENTS

2012/0281563 A1* 11/2012 Comsa .................. H04W 24/10
370/252
2021/0105643 A1   4/2021 Kim et al.
(Continued)

FOREIGN PATENT DOCUMENTS

EP     3800933 A1    4/2021

OTHER PUBLICATIONS

International Search Report and Written Opinion—PCT/US2022/043993—ISA/EPO—Jan. 3, 2023.
(Continued)

*Primary Examiner* — Quoc Thai N Vu
(74) *Attorney, Agent, or Firm* — Holland & Hart LLP/Qualcomm Incorporated

(57) ABSTRACT

Methods, systems, and devices for wireless communications are described. A user equipment (UE) may receive an indication that the UE is to perform radio resource management (RRM) measurements at a first periodicity. The UE may identify an RRM measurement relaxation grouping to which the UE belongs based on at least one of a mobility of the UE or a location of the UE within a cell, such as whether the UE is near a cell-edge, or whether the UE is stationary or moving in accordance with low-mobility, or a combination thereof. The UE may determine a first relaxation parameter from a plurality of relaxation parameters based on measurement relaxation criterion associated with the cell, where the plurality of relaxation parameters may be associated with the RRM measurement relaxation grouping. The UE may perform the RRM measurements at a second periodicity that is based on the first relaxation parameter.

30 Claims, 11 Drawing Sheets

(58) Field of Classification Search
CPC ......... H04W 36/0085; H04W 36/0088; H04W 36/0094; H04W 36/08; H04W 36/32
See application file for complete search history.

(56) References Cited

U.S. PATENT DOCUMENTS

| | | | |
|---|---|---|---|
| 2022/0116802 A1* | 4/2022 | Kim | H04W 76/27 |
| 2022/0322193 A1* | 10/2022 | Tao | H04W 36/0058 |
| 2022/0394532 A1* | 12/2022 | Thangarasa | H04W 52/0209 |

OTHER PUBLICATIONS

Mediatek Inc: "Configurations for RRM Measurement Relaxation in NR", 3GPP TSG-RAN WG2 Meeting #109 electronic, R2-2000312, 3rd Generation Partnership Project, Mobile Competence Centre, 650, Route Des Lucioles, F-06921 Sophia-Antipolis Cedex, France, vol. RAN WG2, No. Elbonia, Feb. 24, 2020-Mar. 6, 2020, Feb. 14, 2020, 5 Pages, XP051848938, chapter 2, The whole document.

* cited by examiner

| Stationary | |
|---|---|
| $S_{SearchDeltaP}$ | K |
| | 2K |
| $X * S_{SearchDeltaP}$ | 4K |
| | 8K |
| $Y * S_{SearchDeltaP}$ | 16K |
| | nK |

| Stationary, not-at-cell edge | |
|---|---|
| $S_{SearchDeltaP}$ | K |
| | 2K |
| $X * S_{SearchDeltaP}$ | 4K |
| | 8K |
| $Y * S_{SearchDeltaP}$ | 16K |
| | nK |

300

TECHNIQUES FOR PERFORMING MEASUREMENT RELAXATION

FIELD OF TECHNOLOGY

The following relates to wireless communications, including techniques for performing measurement relaxation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be connected and within a serving area of a base station, such that the base station is a serving base station of the UE. However, conditions associated with the UE, the serving base station, or both may change, such as quality, load of the serving base station, signal strength, etc. Accordingly, the UE may be configured to periodically perform neighbor cell measurements to determine whether to perform a handover to a neighbor cell, to perform cell re-selection, etc. Techniques for performing the neighbor cell measurements may be improved.

SUMMARY

The described techniques relate to improved methods, systems, devices, and apparatuses that support techniques for performing measurement relaxation. Generally, the described techniques provide for improved methods of implementing measurement relaxation by a user equipment (UE). A serving base station may provide service to a UE. However, the UE may be configured to periodically perform neighbor cell measurements to determine whether to perform a handover to a neighbor cell, to perform cell re-selection, etc. In some cases, the UE may relax the periodicity at which the UE is performing the neighbor cell measurement's so as to reduce the load of the UE. In some cases, the UE may determine a grouping of the UE, such as whether the UE meets stationary conditions or low mobility conditions, and whether the UE is near a cell edge or not. Upon determining a grouping of the UE, the UE may perform serving cell measurement's to determine an indication of a quality of service the UE is receiving from the serving base station. The UE may determine a set of relaxation criterion and compare the serving cell measurements to the set of relaxation criterion to select an appropriate relaxation parameter based on the grouping. The UE may use the relaxation parameter to determine a relaxed periodicity for performing neighbor cell measurements so as to reduce load and power usage of the UE.

For example, a UE may receive an indication that the UE is to perform radio resource management (RRM) measurements at a first periodicity. The UE may identify an RRM measurement relaxation grouping to which the UE belongs based on at least one of a mobility of the UE or a location of the UE within a cell, such as whether the UE is near a cell-edge, or whether the UE is stationary or moving in accordance with low-mobility. The UE may determine a first relaxation parameter (e.g., a scaling factor, a multiple, a fixed duration, or a combination thereof) from a plurality of relaxation parameters based on measurement relaxation criterion associated with the cell, where the plurality of relaxation parameters may be associated with the RRM measurement relaxation grouping. The UE may perform the RRM measurements at a second periodicity that is based on the first relaxation parameter, where the second periodicity may be greater than the first periodicity such that the UE may perform the RRM measurements less often.

A method for wireless communications at a UE is described. The method may include receiving an indication that the UE is to perform radio resource management measurements at a first periodicity, identifying a radio resource management measurement relaxation grouping to which the UE belongs based on at least one of a mobility of the UE or a location of the UE within a cell, determining a first relaxation parameter from a set of multiple relaxation parameters based on a measurement relaxation criterion associated with the cell, where the set of multiple relaxation parameters are associated with the radio resource management measurement relaxation grouping, and performing the radio resource management measurements at a second periodicity that is based on the first relaxation parameter.

An apparatus for wireless communications is described. The apparatus may include a processor, memory coupled with the processor, and instructions stored in the memory. The instructions may be executable by the processor to cause the apparatus to receive an indication that a UE is to perform radio resource management measurements at a first periodicity, identify a radio resource management measurement relaxation grouping to which the UE belongs based on at least one of a mobility of the UE or a location of the UE within a cell, determine a first relaxation parameter from a set of multiple relaxation parameters based on a measurement relaxation criterion associated with the cell, where the set of multiple relaxation parameters are associated with the radio resource management measurement relaxation grouping, and perform the radio resource management measurements at a second periodicity that is based on the first relaxation parameter.

Another apparatus for wireless communications is described. The apparatus may include means for receiving an indication that a UE is to perform radio resource management measurements at a first periodicity, means for identifying a radio resource management measurement relaxation grouping to which the UE belongs based on at least one of a mobility of the UE or a location of the UE within a cell, means for determining a first relaxation parameter from a set of multiple relaxation parameters based on a measurement relaxation criterion associated with the cell, where the set of multiple relaxation parameters are associated with the radio resource management measurement relaxation grouping, and means for performing the radio resource management measurements at a second periodicity that is based on the first relaxation parameter.

A non-transitory computer-readable medium storing code for wireless communications is described. The code may include instructions executable by a processor to receive an indication that a UE is to perform radio resource management measurements at a first periodicity, identify a radio resource management measurement relaxation grouping to which the UE belongs based on at least one of a mobility of the UE or a location of the UE within a cell, determine a first relaxation parameter from a set of multiple relaxation parameters based on a measurement relaxation criterion associated with the cell, where the set of multiple relaxation parameters are associated with the radio resource management measurement relaxation grouping, and perform the radio resource management measurements at a second periodicity that is based on the first relaxation parameter.

Some examples of the method, apparatuses, and non-transitory computer-readable medium described herein may further include operations, features, means, or instructions for identifying the measurement relaxation criterion from a set of measurement relaxation criteria based on the radio resource management measurement relaxation grouping.

Some examples of the method, apparatuses, and non-transitory computer-readable medium described herein may further include operations, features, means, or instructions for determining a second relaxation parameter from the set of multiple relaxation parameters based on satisfying the measurement relaxation criterion at a second time after a first time at which the measurement relaxation criterion was satisfied to trigger determination of the first relaxation parameter, the second relaxation parameter associated with a longer periodicity than the second periodicity.

In some examples of the method, apparatuses, and non-transitory computer-readable medium described herein, the measurement relaxation criterion includes a set of thresholds, each threshold of the set of thresholds may be a cell selection delta threshold.

In some examples of the method, apparatuses, and non-transitory computer-readable medium described herein, each threshold from the set of thresholds may be associated with a different multiplier to be applied to the first relaxation parameter.

In some examples of the method, apparatuses, and non-transitory computer-readable medium described herein, the set of thresholds includes at least a first threshold and a second threshold, the first threshold associated with a smaller multiplier than the second threshold.

In some examples of the method, apparatuses, and non-transitory computer-readable medium described herein, the set of thresholds includes an ordered list of thresholds, the UE may be configured to use a first threshold at the first time and a second threshold at the second time in accordance with the ordered list of thresholds, and the first threshold may be greater than the second threshold.

Some examples of the method, apparatuses, and non-transitory computer-readable medium described herein may further include operations, features, means, or instructions for determining a second relaxation parameter from the set of multiple relaxation parameters based on failure to satisfy the measurement relaxation criterion at a second time after a first time at which the measurement relaxation criterion was satisfied to trigger determination of the first relaxation parameter, the second relaxation parameter associated with a shorter periodicity than the second periodicity.

In some examples of the method, apparatuses, and non-transitory computer-readable medium described herein, determining the first relaxation parameter may include operations, features, means, or instructions for determining a discrete relaxation scaling factor from a set of multiple discrete relaxation scaling factors based on the measurement relaxation criterion associated with the cell.

In some examples of the method, apparatuses, and non-transitory computer-readable medium described herein, determining the first relaxation parameter may include operations, features, means, or instructions for calculating a relaxation scaling factor in accordance with a relaxation scaling factor equation, where the relaxation scaling factor may be a function of a maximum relaxation scaling factor, a cell selection reception level value, a reference cell selection reception level value, a cell selection quality value, a reference cell selection quality value, or a combination thereof.

Some examples of the method, apparatuses, and non-transitory computer-readable medium described herein may further include operations, features, means, or instructions for receiving, from a base station, a message indicating the relaxation scaling factor equation.

In some examples of the method, apparatuses, and non-transitory computer-readable medium described herein, the reference cell selection reception level value and the reference cell selection quality value may be associated with the radio resource management measurement relaxation grouping.

In some examples of the method, apparatuses, and non-transitory computer-readable medium described herein, the relaxation scaling factor equation for calculating the relaxation scaling factor may be linear or non-linear.

In some examples of the method, apparatuses, and non-transitory computer-readable medium described herein, the relaxation scaling factor equation for calculating the relaxation scaling factor may be a transform function.

In some examples of the method, apparatuses, and non-transitory computer-readable medium described herein, identifying the radio resource management measurement relaxation grouping may include operations, features, means, or instructions for identifying that the UE meets a set of criteria for the radio resource management measurement relaxation grouping, the radio resource management measurement relaxation grouping identified from a set of multiple radio resource management measurement relaxation groupings.

In some examples of the method, apparatuses, and non-transitory computer-readable medium described herein, the set of multiple radio resource management measurement relaxation groupings include a stationary and not-at-cell-edge group, a stationary group, a low-mobility and not-at-cell-edge group, a low-mobility group, and a not-at-cell-edge group.

Some examples of the method, apparatuses, and non-transitory computer-readable medium described herein may further include operations, features, means, or instructions for calculating the second periodicity by multiplying the first relaxation parameter with the first periodicity.

Some examples of the method, apparatuses, and non-transitory computer-readable medium described herein may further include operations, features, means, or instructions for receiving, from a base station, a message indicating a set of multiple radio resource management measurement relaxation groupings and a condition for the UE to satisfy for each of the set of multiple radio resource management measurement relaxation groupings, the condition associated with UE mobility or UE location within the cell.

Some examples of the method, apparatuses, and non-transitory computer-readable medium described herein may further include operations, features, means, or instructions for receiving, from a base station, a message indicating the set of multiple relaxation parameters associated with the radio resource management measurement relaxation grouping.

Some examples of the method, apparatuses, and non-transitory computer-readable medium described herein may further include operations, features, means, or instructions for measuring one or more reference signal parameters associated with the cell, the one or more reference signal parameters including reference signal received power measurements, reference signal received quality measurements, or both and calculating one or more cell selection parameters based on the one or more reference signal parameters.

Some examples of the method, apparatuses, and non-transitory computer-readable medium described herein may further include operations, features, means, or instructions for comparing the one or more cell selection parameters to the measurement relaxation criterion after each of a set of multiple time intervals, where the set of multiple time intervals may be uniform or non-uniform and determining that the one or more cell selection parameters satisfies the measurement relaxation criterion.

In some examples of the method, apparatuses, and non-transitory computer-readable medium described herein, the one or more cell selection parameters include a cell selection reception level value and a reference cell selection reception level value.

In some examples of the method, apparatuses, and non-transitory computer-readable medium described herein, the UE performs the radio resource management measurements in accordance with the first relaxation parameter while the UE may be in a radio resource control idle or inactive state.

DETAILED DESCRIPTION

Figure 1:
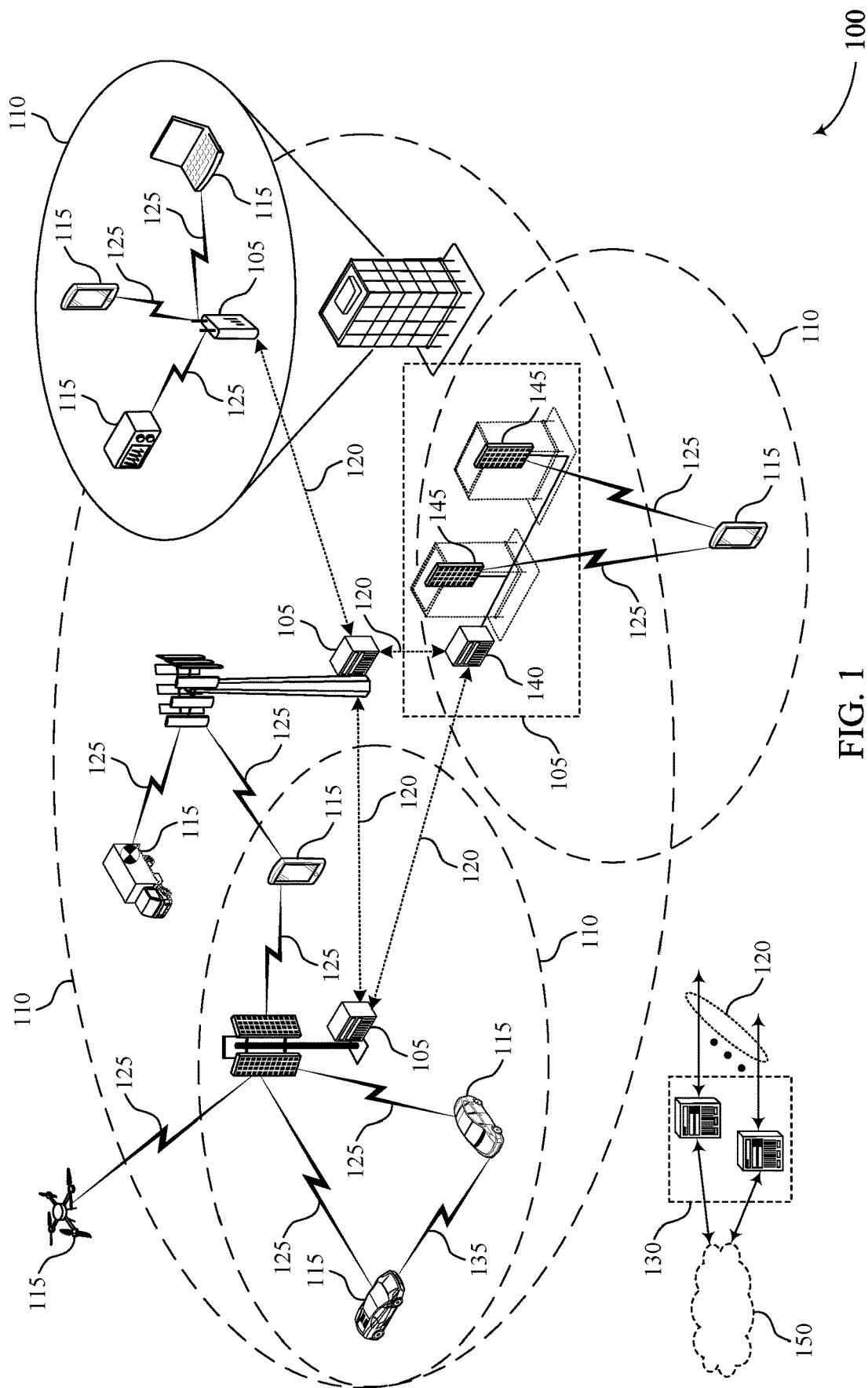
FIG. 1 illustrates an example of a wireless communications system that supports techniques for performing measurement relaxation in accordance with aspects of the present disclosure.

In some wireless communications systems, a serving base station may provide service to a user equipment (UE). However, the UE may be configured to periodically perform neighbor cell measurements, such as intra-frequency, inter-frequency, and inter-RAT measurements. Based on the neighbor cell measurements the UE may determine whether to perform a handover procedure, or a cell re-selection procedure with a neighboring base station. Performing such neighbor cell measurements may lead to increased power consumption of the UE. Accordingly, in some cases, a UE may be configured to determine whether the UE may relax the priority at which the UE is performing neighbor cell measurements. For example, if the UE is not near the cell edge of the serving base station, or if the UE meets the conditions for low mobility, then the UE may use a relaxation factor, K, which the UE may use as a multiplier applied to the neighbor cell measurement periodicity. Accordingly, the UE may relax the frequency at which the UE is performing the neighbor cell measurements. If the UE meets both conditions (e.g., low mobility and not near the cell edge), then the UE may relax the neighbor cell periodicity for up to a maximum time, such as one hour.

In some cases, a device that is stationary may be considered a low mobility device. Accordingly, the same relaxation factor K, may be applied to both a device that is stationary, and a device that is moving. Additionally, the mobility conditions of a device may change dynamically. For example, a device may be stationary for a duration, then move slowly, to moving quickly, etc. As such, a single relaxation factor, K, and relaxation criterion for each UE condition without considering a mobility or stationary duration of the UE may not be appropriate. For example, the overall relaxation criterion may be too strict, such that many devices may be unable to implement the relaxation methods, or the relaxation duration may be too small for some UEs to benefit. For example, a device that is stationary for long durations may be able to decrease neighbor cell measurement periodicity more so than a mobile UE. Accordingly, the relaxation procedure may be configured to include a separate grouping for stationary devices and may also be adapted such that the relaxation factors may be based on the grouping of the UE. For example, the relaxation factors for a stationary device may be different than the factors associated with a low mobility device.

Such a relaxation procedure may include a UE determining a grouping of the UE, such as whether the UE meets stationary conditions or low mobility conditions, and whether the UE is near a cell edge or not. Upon determining a grouping of the UE, the UE may perform serving cell measurements to determine a quality of service being provided to the UE by the serving base station. The UE may be configured with a set of measurement relaxation criterion. For example, the UE may be preconfigured with the set, or may receive an indication of the set such as from a base station, or some other network device. The UE may compare the serving cell measurements to the set of relaxation criterion. Based on the comparison, the UE may select a relaxation parameter based on the grouping. Accordingly, the relaxation parameter may be based on the mobility and location of the UE, and based on the quality of the service being provided by the base station. The UE may use the relaxation parameter to determine a relaxed periodicity for performing neighbor cell measurements so as to reduce load and power usage of the UE. For example, a stationary device may perform neighbor cell measurements less often than a device that is mobile. Additionally, if a device is receiving service from the serving base station of the UE that does not meet a threshold, then the device may be configured to refrain from relaxing the neighbor cell measurements, or to reduce the relaxation factor applied to the measurement periodicity. Similarly, a device that is stationary for a long duration and is receiving high quality service from the serving base station of the UE may be configured to perform the neighbor cell measurements in accordance with a large periodicity. In some cases, the UE may be configured to re-evaluate the relaxation factor periodically and may be configured to employ more relaxed factors as the UE remains in a condition, such as stationary, for longer and longer.

Particular aspects of the subject matter described herein may be implemented to realize one or more advantages. The described techniques may support improvements in utilizing neighbor cell relaxation methods by increasing the flexibility and options associated with relaxation methods. The described techniques may further improve performance at a UE by decreasing measurement requirements when not necessary, thereby decreasing power usage and improve the efficiency of resource usage. As such, supported techniques may include improved network operations and, in some examples, may promote network efficiencies, among other benefits.

Aspects of the disclosure are initially described in the context of wireless communications systems. Aspects are the described with reference to relaxation factor tables, and a process flow. Aspects of the disclosure are further illustrated by and described with reference to apparatus diagrams, system diagrams, and flowcharts that relate to techniques for performing measurement relaxation.

FIG. 1 illustrates an example of a wireless communications system 100 that supports techniques for performing measurement relaxation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a UE 115 may be configured to relax RRM measurements based on location and/or mobility of the UE 115. For example, a UE 115 may receive an indication that the UE 115 is to perform RRM measurements at a first periodicity. The UE 115 may identify an RRM measurement relaxation grouping to which the UE 115 belongs based on at least one of a mobility of the UE 115 or a location of the UE 115 within a cell (e.g., a geographic coverage area), such as whether the UE 115 is near a cell-edge, or whether the UE 115 is stationary or moving in accordance with low-mobility. The UE 115 may determine a first relaxation parameter (e.g., a scaling factor, a multiple, or both) from a plurality of relaxation parameters based on measurement relaxation criterion associated with the cell, where the plurality of relaxation parameters may be associated with the RRM measurement relaxation grouping. The UE 115 may perform the RRM measurements at a second periodicity that is based on the first relaxation parameter, where the second periodicity may be greater than the first periodicity such that the UE 115 may perform the RRM measurements less often.

Figure 2:
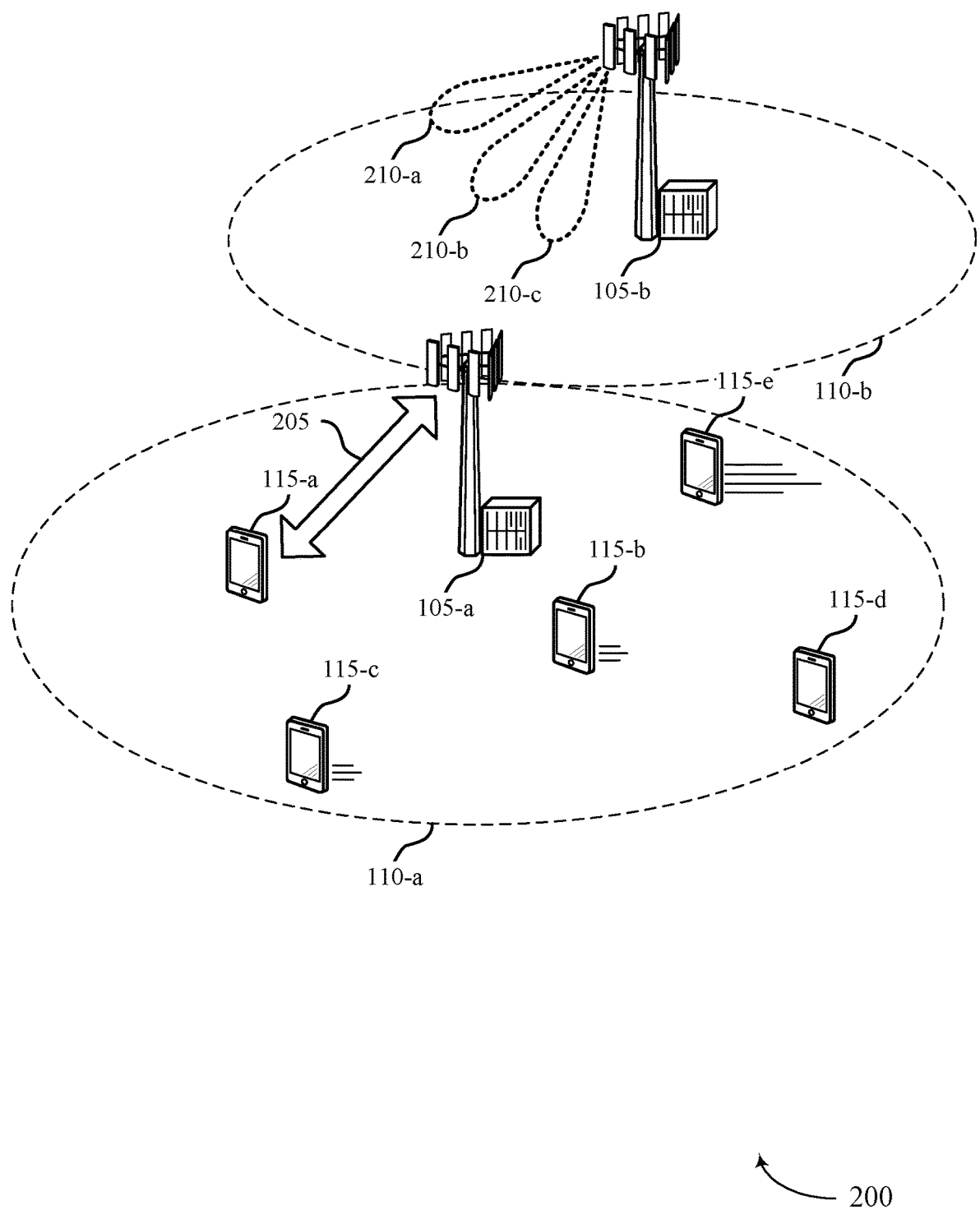
FIG. 2 illustrates an example of a wireless communications system that supports techniques for performing measurement relaxation in accordance with aspects of the present disclosure.

FIG. 2 illustrates an example of a wireless communications system 200 that supports techniques for performing measurement relaxation in accordance with aspects of the present disclosure. The wireless communications system 200 may include base stations 105-a and 105-b, and UEs 115-a, 115-b, 115-c, 115-d, and 115-e, which may be examples of base stations 105 and UEs 115 as described with reference to FIG. 1. Base station 105-a may serve a geographic coverage area 110-a and base station 105-b may service geographic coverage area 110-b. In some cases, one or more UEs 115 within coverage 110-a may determine whether to relax neighbor cell measurements, such as measurements associated with base station 105-b, based on a grouping of the UE 115. Additionally or alternatively, other wireless devices may implement a same or similar measurement relaxation procedure.

Base station 105-a may serve geographic coverage area 110-a such that base station 105-a may provide service to UEs 115 within geographic coverage area 110-a (e.g., a cell), such as UEs 115-a through 115-e. However, as a UE 115 may be mobile, the UE 115 may move to a cell edge, or outside of a cell. Additionally or alternatively, environmental conditions may change dynamically. For example, a base station 105 may become overloaded with UEs 115, an object may block communications between a UE 115 and a serving base station 105, etc. Accordingly, a UE 115 may be configured to periodically perform neighbor cell measurements (e.g., RRM measurements), such as intra-frequency, inter-frequency, and inter-RAT measurements. For example, while being served by base station 105-a, UEs 115-a through 115-e may each be configured to monitor for signals from base station 105-b, such as reference signals, and may measure the received signals. For example, base station 105-b may transmit reference signals over beams 210-a, 210-b, and 210-c. If a UE 115 receives one or more reference signals via one of the beams 210, the UE 115 may measure one or more parameters associated with the signals, such as signal strength (e.g., reference signal received power (RSRP)), and/or signal quality (e.g., reference signal received quality (RSRQ)). In some cases, a UE 115 may be monitoring for and measuring signals associated with multiple neighboring base stations 105 and may be configured to perform neighbor cell measurements in accordance with a periodicity.

Based on the neighbor cell measurements, the UE 115 may determine whether to perform a handover procedure, or a cell re-selection procedure with the neighboring base station 105. Additionally or alternatively, the UE 115 may transmit a measurement report to the base station 105 serving the UE 115, such as base station 105-a, indicating the RRM measurements and the base station 105 may determine whether the UE 115 should perform a handover procedure to establish a connection with a neighboring base station 105. For example, the UE 115 or base station 105-a may determine that base station 105-b may provide the UE 115 with higher quality communications, higher strength communications, or both than base station 105-a and thus may determine to perform a handover procedure to base station 105-b. However, performing such neighbor cell measurements may lead to increased power consumption and reduced throughput of the UE 115, particularly when the UE 115 is receiving quality service from a serving base station 105, when the UE 115 is well within the coverage area of the serving base station 105, when the location of the UE 115 is remaining relatively constant, or a combination thereof. For example, a UE 115 may be far from the cell edge and accordingly, may be unlikely to be better served by another base station 105. Additionally or alternatively, the UE 115 may be stationary or have low mobility. Therefore, if the UE 115 is currently served with a high enough quality and strength by the serving base station 105 of the UE 115, then the UE 115 is unlikely to be better served by another base station 105 soon.

Accordingly, in some cases, a UE 115 may be configured to determine whether to relax the periodicity at which the UE 115 is performing the neighbor cell measurements. In some cases, the UE 115 may be configured to relax the periodicity in accordance with a fixed duration. For example, the UE 115 may refrain from performing measurements for the fixed duration, such as one hour. The UE 115 may be configured with the fixed duration, determine the fixed duration from a set of fixed durations, calculate the fixed duration, or a combination thereof. In some cases, the UE 115 may be configured to relax the periodicity by multiplying a scaling factor, K, to the measurement periodicity. For example, if the UE 115 is configured to perform neighbor cell measurements every 10 seconds, then upon determining a scaling factor the UE 115 may perform the measurements every K*10 seconds, thereby decreasing the frequency of neighbor cell measurements.

In some cases, the UE 115 may determine the scaling factor based on group to which the UE 115 belongs, where the groups may be based on the mobility and/or location of the UE 115. The groupings may include a stationary group, a stationary and not-near-cell-edge group, a low-mobility group, a low-mobility and not-near-cell-edge group, a not-near-ell-edge group, or a combination thereof. For example, UE 115-d may determine that UE 115-d currently fits into the stationary group because UE 115-d is not moving (e.g., remaining in the same location), and may be considered to be located at the cell edge. UE 115-a may currently meet the criteria for the stationary and not-near-cell-edge group because UE 115-a is not moving, and may be considered a large enough distance away from the cell edge, within a distance from the center of cell, etc. UE 115-c may meet the criteria of the low-mobility group because UE 115-c may be moving at a velocity and/or acceleration below a threshold, moving less than a distance threshold within a time interval, etc. UE 115-b may meet the criteria for the low-mobility and not-near-cell-edge group. It should be understood that the groups are not limited to those described herein and may include any number of groups that describe UE conditions.

In some cases, UE 115-e may not meet the criteria for a group because UE 115-e is highly mobile and/or near the cell edge. Therefore, UE 115-e may be likely to move out of the serving area of base station 105-a and/or to be better served by a neighbor base station 105. Accordingly, UE 115-e may refrain from performing measurement relaxation procedures.

Upon determining a group to which the UE 115 belongs, the UE 115 may identify a relaxation factor. The relaxation factor may be different for each group. For example, the stationary and not-near-cell-edge may be associated with a larger relaxation factor than the low-mobility UE 115. A UE 115 that has low mobility may be more likely to perform a handover procedure than a UE 115 that is stationary and not-near-cell-edge. Accordingly, the stationary and not-near-cell-edge UE 115 may relax the low-mobility measurements more than a low-mobility UE 115. In some cases, the relaxation factors across multiple groups may be the same.

In some cases, to determine a relaxation factor, UE 115 may compare cell selection measurements to cell selection criterion, S, to determine an indication of a quality of service the UE 115 is receiving from the serving base station 105. If the UE 115 meets the criterion, the UE 115 may determine a relaxation factor to relax the frequency at which the UE 115 performs the neighbor cell measurements. In some cases, to satisfy the cell selection criterion, the UE 115 is to satisfy cell selection criterion for quality (e.g., Squal), a cell selection criterion for reception level (e.g., Srxlev), or both. For example, the UE 115 may satisfy the cell selection criterion and use a relaxation parameter when the UE 115 satisfies Equation 1.

$$(Srxlev_{Ref} - Srxlev) < S_{SearchDeltaP} \qquad (1)$$

$S_{SearchDeltaP}$ may specify a threshold (in dB) for Srxlev variation for relaxed measurement. Srxlev may refer to a cell selection reception level value (dB) and Srxlev Ref may refer to a reference value (e.g., a preconfigured value). The cell selection criterion may be based on RSRP and/or RSRQ measurements. Accordingly, UE 115 may measure RSRP and/or RSRQ associated with the serving base station 105 of the UE 115, and the UE 115 may use the RSRP and/or RSRQ value to calculate Srxlev and/or Squal. The UE 115 may then perform the cell selection comparison of Equation 1, for example, to determine whether the UE 115 meets the cell selection criterion.

In some cases, the cell selection criterion the UE 115 is to satisfy before utilizing a relaxation factor may be based on grouping. For example, whether the UE 115 is to satisfy a Srxlev threshold, Squal threshold, or both may be group dependent. Additionally or alternatively, the value of the Srxlev threshold and/or the value of the Squal threshold may be group dependent. For example, $S_{SearchDeltaP,lowmobility}$ may be defined for the low mobility group, and $S_{SearchDeltaP,staionary}$ may be defined for the stationary group, and so on. Accordingly, upon determining a group for which the UE 115 belongs, the UE 115 may use the cell selection criterion associated with the group to determine whether the UE 115 may use a relaxation factor to decrease the frequency of neighbor cell measurements. In some cases, the cell selection criterion may not be group specific. For example, general cell selection criteria may be configured, and if a UE 115 meets the criterion for a grouping and satisfies the general cell selection criterion, the UE 115 may use a relaxation factor.

Upon determining a grouping and that the UE 115 satisfies cell selection criterion, the UE 115 may determine the relaxation factor, where the relaxation factor may be group-dependent. For example, each grouping may be associated with a group-specific set of one or more relaxation factors, as described in more detail with reference to FIG. 3. In some cases, the set of one or more relaxation factors may include discrete relaxation factors (e.g., a static relaxation factor). In some cases, the set of relaxation factors may be calculated by an equation, such as a linear function. For example, Equation 2 and Equation 3 may each be an example of a linear relaxation factor equation. f1 and f2 may be linear or non-linear transform functions and may be based on cell selection measurements, such as Srxlev, Squal, or both. Accordingly, the relaxation factor may change as Srxlev and/or Squal change.

$$K=\max(K_{max},K*f1(Srxlev_{ref}-Srxlev),(Squal_{ref}-Squal)) \quad (2)$$

$$K=\max(K_{max},K*f2((Srxlev_{ref}-Srxlev),(Squal_{ref}-Squal)) \quad (3)$$

In some cases, the relaxation factor equation may be non-linear. Equation 4 may be an example of a non-linear relaxation factor equation, where K may scale as a power of two. f3 may be a linear or non-linear transform function, and may be based on cell selection measurements, such as Srxlev, Squal, or both. f1, f2, and f3 may be the same or different functions.

$$K=\max(K_{max},K*2^{f3((Srxlev_{ref}-Srxlev),(squal_{ref}-Squal))}) \quad (4)$$

Upon determining a relaxation parameter, the UE 115 may calculate a periodicity at which the UE 115 may perform neighbor cell measurements by multiplying the relaxation factor by an original or previously determined periodicity. In some implementations, the UE 115 may be configured to re-evaluate the relaxation factor being used in accordance with a second periodicity (e.g., a periodicity separate from the measurement periodicity). For example, a UE 115 may determine whether the UE 115 continues to satisfy the criteria for the grouping the UE 115 previously used, the UE 115 may determine whether the UE 115 satisfies the cell-selection criterion, or both in accordance with the second periodicity. In some cases, if the UE 115 continues to meet the criterion for the grouping, or satisfies the cell selection criterion, or both, the UE 115 may continue using the relaxation factor. If, however, the UE 115 fails to meet the criterion for the grouping, or fails to satisfy the cell selection criterion, or both, the UE 115 may fall back to a non-relaxation mode or fallback to a less-relaxed measurement periodicity, as described in more detail with reference to FIG. 3. In some cases, the UE may be configured to re-calculate the relaxation factor in accordance with the second periodicity. In some cases, the UE may be configured to re-calculate the relaxation factor based on whether the UE successfully completed the re-evaluation procedure. For example, if the UE 115 continues to meet the criterion for the grouping, or satisfies the cell selection criterion, or both, the UE 115 may be configured to re-calculate the factor. In another example, if the UE 115 continues to meet the criterion for the grouping, or satisfies the cell selection criterion, or both, the UE 115 may be configured to use the previously calculated factor (e.g., rather than re-calculating).

In some cases, the second periodicity may be uniform or non-uniform. For example, in the case of a uniform second periodicity, the UE 115 may be configured with, receive signaling, or otherwise determine the second periodicity and use the second periodicity for each re-evaluation. In an example of a non-uniform second periodicity, the second periodicity may be configured to change over time. In some cases, the second periodicity may become larger and larger the more times that UE 115 completes a successful re-evaluation. In some other case, the may become smaller and smaller the more times that UE 115 completes a successful re-evaluation.

Figure 3:
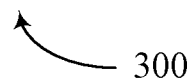
FIG. 3 illustrates an example of relaxation factor tables that support techniques for performing measurement relaxation in accordance with aspects of the present disclosure.

FIG. 3 illustrates an example of relaxation factor tables 300 that support techniques for performing measurement relaxation in accordance with aspects of the present disclosure. The relaxation factor tables 300 may be used by base stations, or UEs to determine a relaxation factor applicable to neighbor cell measurements, which may be examples of base stations and UEs as described with reference to FIGS. 1 and 2.

In some cases, multiple relaxation factors may be configured for each group. For example, upon satisfying cell selection criterion and determining a grouping, the UE 115 may identify a set of relaxation factors associated with the grouping. For example, if a UE determines that the UE fits into a stationary group, the UE may select a relaxation factor from a stationary relaxation factor table including a set of one or more relaxation factor, as depicted in FIG. 3. Alternatively, if a UE determines that the UE fits into a stationary and not-at-cell edge group, the UE may select a relaxation factor from a stationary, not-at-cell edge relaxation factor table including a set of one or more relaxation factor, as depicted in FIG. 3. The relaxation factors may be different, or partially different across groupings. In some cases, some groupings may include more relaxation factors than others.

The set of relaxation factors for a grouping may be ordered and a UE 115 may be configured to select a relaxation factor from the multiple relaxation factors based on a duration the UE remains in the group, or satisfies the cell-selection criterion, or both. In some cases, the set of relaxation factors may order the relaxation factors in ascending order. A UE 115 may be configured to select the most conservative relaxation factor (e.g., K) upon fulfilling the corresponding cell section criterion for the first time. In the case that the relaxation factors are ordered from smallest to largest, the UE 115 may select the first relaxation factor in the list. In accordance with the second periodicity as described with reference to FIG. 2, at a second time, the UE 115 may re-evaluate the relaxation factor the UE 115 is using. For example, at the second time, the UE 115 may determine whether the UE 115 continues to satisfy the criteria for the grouping the UE 115 previously used, the UE 115 may determine whether the UE 115 satisfies the cell-selection criterion, or both. Accordingly, if at the second time the UE 115 continues to satisfy the criteria of the previously selected grouping, continues to satisfy the cell selection criterion (e.g., general cell selection criterion, group-specific cell selection criterion), or both, the UE 115 may select the next relaxation factor from the ordered set of relaxation factors. As the relaxation factors may be configured in ascending order, at the second time, the UE may select a relaxation factor (e.g., a second relaxation factor) greater than the previously used relaxation factor, such that over time, the UE may relax the measurement periodicity more and more. Accordingly, the relaxation factor may provide for longer relaxations based on long-term channel statistics. In some cases, the second relaxation factor may be the same relaxation factor that was used for the first time. For example, the relaxation factor may not change at each successful re-evaluation.

In some cases, the cell selection criterion, as described with reference to FIG. 2, may become more strict with time, as depicted in the relaxation factor tables 300. For example, as the UE continues to select larger and larger relaxation factors, such that the UE is performing measurements with more and more time between each, the UE may have to satisfy stricter and stricter criterion to ensure that the UE may appropriately relaxing measurements further. The stricter criterion may be represented by a multiplier applied to a baseline criterion, where X and Y may be the multipliers. In one example, X may equal to 0.75 and Y may be equal to 0.5. A UE may determine that it satisfies $S_{SearchDeltaP}$, at a first time, and accordingly selects K as the relaxation factor. Then in accordance with the second periodicity, at a second time, the UE continues to satisfy $S_{SearchDeltaP}$, and accordingly selects 2K as the relaxation factor. Then, at a third time (e.g., in accordance with the second periodicity) the UE determines that it satisfies $0.75*S_{SearchDeltaP}$, and accordingly selects 4K as the relaxation factor, and so on.

In some implementations, if a UE fails to satisfy the criterion (e.g., grouping criterion, cell-selection criterion) at a re-evaluation time, the UE may be configured to fallback to a previously used relaxation factor. For example, if at the third time the UE determines that it does not satisfy $0.75*S_{SearchDeltaP}$, then the UE may fallback to K from 2K. In some implementations, if a UE fails to satisfy the criterion (e.g., grouping criterion, cell-selection criterion) at a re-evaluation time, the UE may be configured to continue using the current relaxation factor. For example, if at the third time the UE determines that it does not satisfy $0.75*S_{SearchDeltaP}$, then the UE may continue using 2K. In some implementations, if a UE fails to satisfy the criterion (e.g., grouping criterion, cell-selection criterion) at a re-evaluation time, the UE may be configured to stop performing measurement relaxation. For example, if at the third time the UE determines that it does not satisfy $0.75*S_{SearchDeltaP}$, then the UE may refrain from using any relaxation factor for the next measurement interval. In such cases, the UE may restart the measurement relaxation procedure and re-evaluate the initial grouping and cell-selection criterion as described herein to begin performing measurement relaxation again.

In some cases, the relaxation factor tables 300 may indicate the actual relaxation factor. For example, K may represent a discrete number, and accordingly 2K may represent a discrete number double that of K, and so on. In some cases, the relaxation factor tables 300 may indicate a multiplier to be applied to an already determined relaxation factor. For example, a UE 115 may determine a relaxation factor in accordance with the techniques described with reference to FIG. 2, such as by an equation. Then, the UE 115 may determine a multiplier to apply to the relaxation factor based on the relaxation factor tables 300. For example, a UE calculate a relaxation factor, select a generic relaxation factor, or select a relaxation factor from a set, equal to 2 and then apply an appropriate multiplier of 2, such that the UE may apply a total factor of 4 to the measurement periodicity.

In some implementations, a UE may determine a relaxation grouping to which the UE 115 belongs based on measurement relaxation criterion. For example, the relaxation criterion may be defined to determine the state of the UE (e.g., stationary, low-mobility, not-at-cell edge etc.) Based on the relaxation grouping, the UE may identify a method for determining a relaxation factor (e.g., a fixed duration, a scaling factor, a multiplier), such as the cell-selection criterion associated with the grouping, the type of relaxation being determined (e.g., a fixed duration, a scaling factor, a multiplier), or both. The UE may perform the appropriate cell selection measurements, compare the measurements to the cell-selection criterion, and determine an appropriate relaxation factor. The UE may then relax the neighbor cell measurements in accordance with the determined relaxation factor.

The measurement relaxation procedures described herein may support dynamic determination of a relaxation factor that may be applied to neighbor cell measurements. Such techniques may allow for increased performance of reduced capability devices (e.g., NR-RedCap devices) such as wearables, industrial wireless sensor networks (IWSN), surveillance cameras, Low-end smartphones, etc. as the devices may reduce unnecessary measurements. The techniques described herein may allow for enhanced performance of devices in which mobility conditions change based on use-cases, time of day, etc. For example, industrial sensors may remain stationary for long durations or may always be stationary and accordingly, based on the procedures described herein, may reduce load due to refraining from performing unnecessary measurements. Additionally, the techniques described herein may support the dynamic nature of some devices, such a wearables and low-end smartphones, that may remain stationary for varying durations depending on the usage.

In some cases, a UE may be configured with relaxation factor tables 300 and/or be configured with a relaxation parameter procedure to select a relaxation factor. The UE may receive signaling of the relaxation factor tables 300 and/or the procedure, such as aperiodic, semi-static, or dynamic signaling (e.g., RRC, MAC-CE, DCI). In some cases, the UE may receive the signaling from a base station, such as a serving base station or neighboring base station 105, or via some other network device, such as another UE 115, nodes, etc. In some implementations, the UE may be preconfigured with the relaxation factor tables 300.

The depicted relaxation factor tables 300 should be understood to be merely examples. A UE 115 may be configured with any number of groupings that may be associated with possible UE scenarios (e.g., location, mobility), and any number of relaxation factors per grouping. The depicted relaxation factor tables 300 represent examples configurations for the groupings, relaxation factors, etc., such that such information may be configured in lists, tables, etc.

Figure 4:
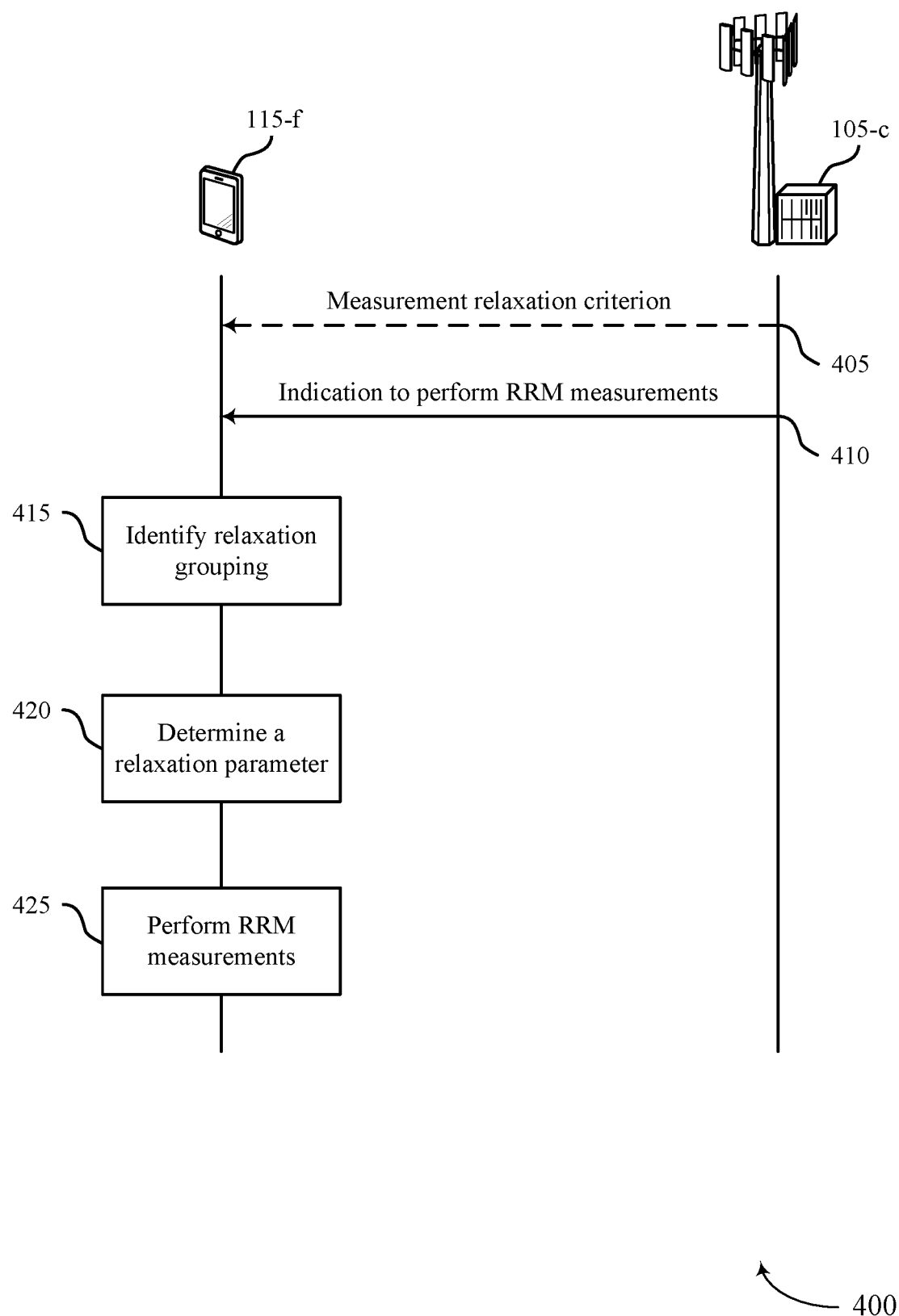
FIG. 4 illustrates an example of a process flow that supports techniques for performing measurement relaxation in accordance with aspects of the present disclosure.

FIG. 4 illustrates an example of a process flow 400 that supports techniques for performing measurement relaxation in accordance with aspects of the present disclosure. The process flow 400 may illustrate an example measurement relaxation procedure. For example, UE 115-*f* may determine whether to relax RRM measurements based on a location, mobility level, or both of UE 115-*f*. Base station 105-*c* and UE 115-*f* may be examples of the corresponding wireless devices described with reference to FIGS. 1 through 3. In some cases, instead of UE 115-*f* implementing the measurement relaxation procedure, a different type of device (e.g., a base station, IAB node, relay node) may perform a same or similar procedure. Alternative examples of the following may be implemented, where some steps are performed in a different order than described or are not performed at all. In some cases, steps may include additional features not mentioned below, or further steps may be added.

At 405, in some cases, UE 115-*f* may receive, from base station 105-*c* or from some other network device, an indication of measurement relaxation criterion for the UE 115 to use to determine a relaxation grouping, a relaxation parameter, or both.

At 410, UE 115-*f* may receive an indication that UE 115-*f* is to perform radio resource management measurements at a first periodicity.

At 415, UE 115-*f* may identify a radio resource management measurement relaxation grouping to which UE 115-*f* belongs based on at least one of a mobility of UE 115-*f* or a location of UE 115-*f* within a cell. In some cases, identifying the radio resource management measurement relaxation grouping may include identifying that UE 115-*f* meets a set of criteria for the radio resource management measurement relaxation grouping. The radio resource management measurement relaxation grouping may be identified from a plurality of radio resource management measurement relaxation groupings. The plurality of radio resource management measurement relaxation groupings may include a stationary and not-at-cell-edge group, a stationary group, a low-mobility and not-at-cell-edge group, a low-mobility group, and a not-at-cell-edge group.

In some cases, UE 115-*f* may receive, from a base station, such as base station 105-*c*, a message indicating a plurality of radio resource management measurement relaxation groupings and a condition for UE 115-*f* to satisfy for each of the plurality of radio resource management measurement relaxation groupings, where the condition may be associated with UE mobility or UE location within the cell.

At 420, UE 115-*f* may determine a first relaxation parameter from a plurality of relaxation parameters based at least in part on measurement relaxation criterion associated with the cell, where the plurality of relaxation parameters may be associated with the radio resource management measurement relaxation grouping. In some cases, UE 115-*f* may identify the measurement relaxation criterion from a set of measurement relaxation criterion based at least in part on the measurement relaxation criterion being associated with the radio resource management measurement relaxation grouping. In some cases, determining the first relaxation parameter may include determining a discrete relaxation scaling factor from a plurality of discrete relaxation scaling factors based at least in part on the measurement relaxation criterion associated with the cell.

In some cases, determining the first relaxation parameter may include calculating a relaxation scaling factor in accordance with a relaxation scaling factor equation. The relaxation scaling factor may be a function of a maximum relaxation scaling factor, a cell selection reception level value, a reference cell selection reception level value, a cell selection quality value, a reference cell selection quality value, or a combination thereof. The reference cell selection reception level value and the reference cell selection quality value may be associated with the radio resource management measurement relaxation grouping. The relaxation scaling factor equation for calculating the relaxation scaling factor may be linear or non-linear. The relaxation scaling factor equation for calculating the relaxation scaling factor may be a transform function. UE 115-*f* may receive, from a base station 105, such as base station 105-*c*, a message indicating the relaxation scaling factor equation.

In some cases, UE 115-*f* may calculate the second periodicity by multiplying the first relaxation parameter with the first periodicity.

In some cases, UE 115-*f* may receive, from a base station (e.g., base station 105-*c*), a message indicating the plurality of relaxation parameters associated with the radio resource management measurement relaxation grouping.

In some cases, UE 115-*f* may measure one or more reference signal parameters associated with the cell. The one or more reference signal parameters may include reference signal received power measurements, reference signal received quality measurements, or both. UE 115-*f* may calculate one or more cell selection parameters based at least in part on the one or more reference signal parameters. UE 115-*f* may compare the one or more cell selection parameters to the measurement relaxation criterion after each of a plurality of time intervals, wherein the plurality of time intervals may be uniform or non-uniform. UE 115-*f* may determine that the one or more cell selection parameters satisfies the measurement relaxation criterion. The one or more cell selection parameters comprise a cell selection reception level value and a reference cell selection reception level value. UE 115-*f* may perform the radio resource management measurements in accordance with the first relaxation parameter while UE 115-*f* is in a radio resource control idle or inactive state.

At 425, UE 115-*f* may perform the radio resource management measurements at a second periodicity that may be based at least in part on the first relaxation parameter.

In some implementations, UE 115-*f* may determine a second relaxation parameter from the plurality of relaxation parameters based at least in part on satisfying the measurement relaxation criterion at a second time after a first time at which the measurement relaxation criterion was satisfied to trigger determination of the first relaxation parameter. The second relaxation parameter may be associated with a longer periodicity than the second periodicity. The measurement relaxation criterion may include a set of thresholds, where each threshold of the set of thresholds may be a cell selection delta threshold (e.g., $S_{SearchDeltaP}$). Each threshold from the set of thresholds may be associated with a different multiplier to be applied to the first relaxation parameter, where the second periodicity may be based at least in part on a multiplier.

The set of thresholds may include at least a first threshold and a second threshold, where the first threshold may be associated with a smaller multiplier than the second threshold. The set of thresholds may include an ordered list of thresholds, where UE 115-*f* may be configured to use a first threshold at the first time and a second threshold at the second time in accordance with the ordered list of thresholds. The first threshold may be greater than the second threshold.

In some implementations, UE 115-*f* may determine a second relaxation parameter from the plurality of relaxation parameters based at least in part on failure to satisfy the measurement relaxation criterion at a second time after a first time at which the measurement relaxation criterion was satisfied to trigger determination of the first relaxation parameter. The second relaxation parameter may be associated with a shorter periodicity than the second periodicity.

Figure 5:
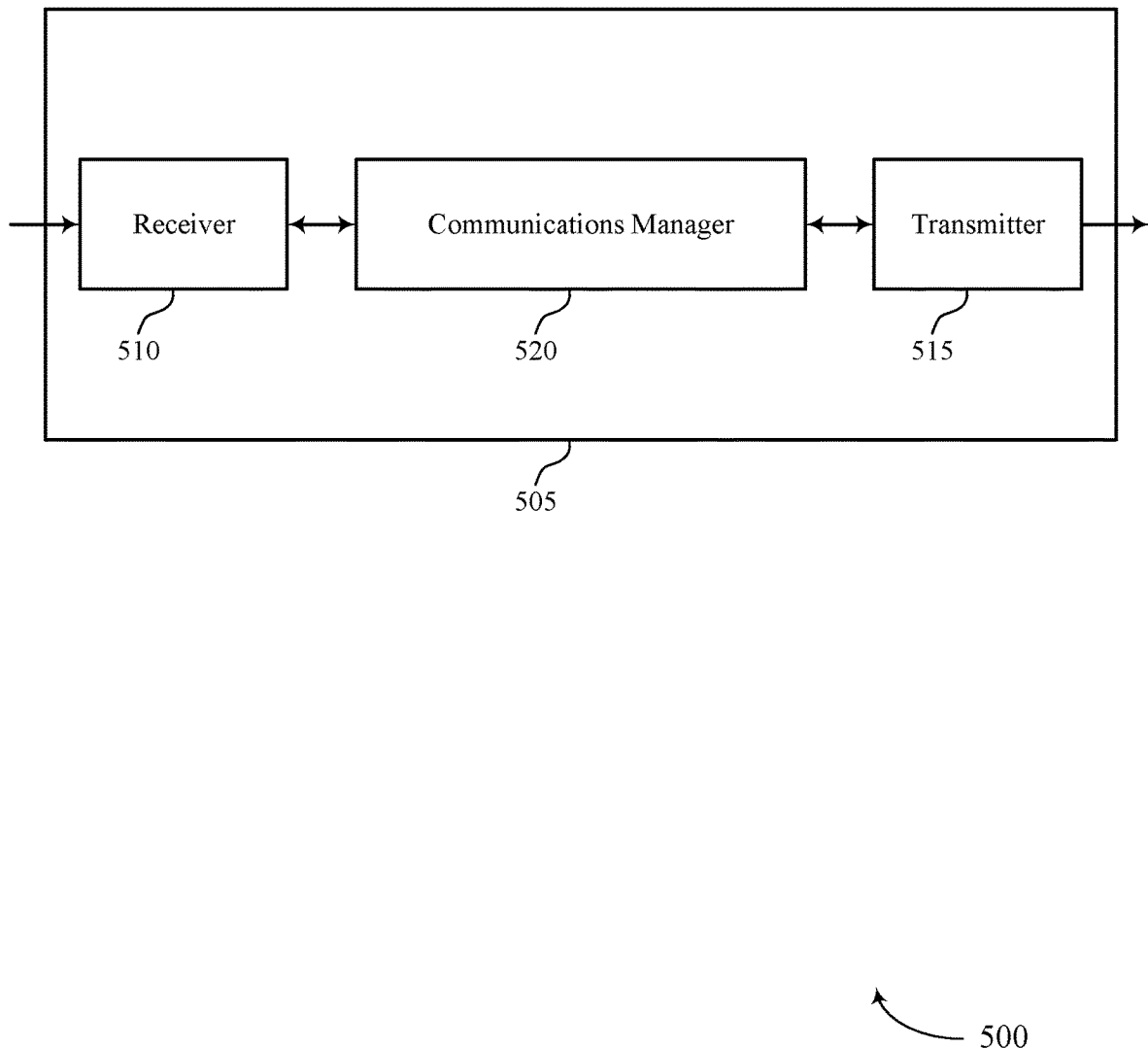
FIGS. 5 and 6 show block diagrams of devices that support techniques for performing measurement relaxation in accordance with aspects of the present disclosure.

FIG. 5 shows a block diagram 500 of a device 505 that supports techniques for performing measurement relaxation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for performing measurement relaxation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for performing measurement relaxation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for performing measurement relaxation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving an indication that the UE is to perform radio resource management measurements at a first periodicity. The communications manager 520 may be configured as or otherwise support a means for identifying a radio resource management measurement relaxation grouping to which the UE belongs based on at least one of a mobility of the UE or a location of the UE within a cell. The communications manager 520 may be configured as or otherwise support a means for determining a first relaxation parameter from a set of multiple relaxation parameters based on a measurement relaxation criterion associated with the cell, where the set of multiple relaxation parameters are associated with the radio resource management measurement relaxation grouping. The communications manager 520 may be configured as or otherwise support a means for performing the radio resource management measurements at a second periodicity that is based on the first relaxation parameter.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
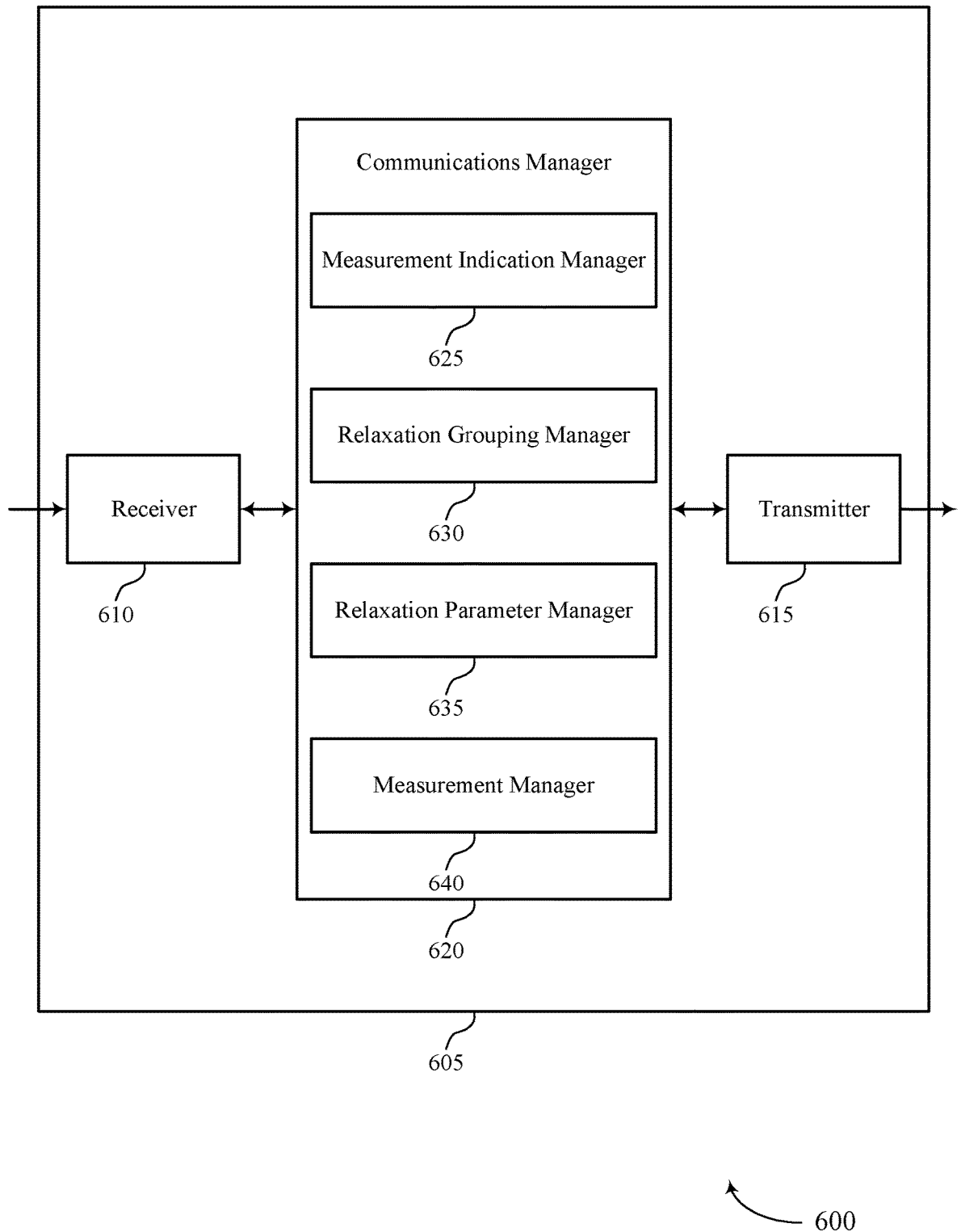

FIG. 6 shows a block diagram 600 of a device 605 that supports techniques for performing measurement relaxation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing measurement relaxation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing measurement relaxation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for performing measurement relaxation as described herein. For example, the communications manager 620 may include a measurement indication manager 625, a relaxation grouping manager 630, a relaxation parameter manager 635, a measurement manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The measurement indication manager 625 may be configured as or otherwise support a means for receiving an indication that the UE is to perform radio resource management measurements at a first periodicity. The relaxation grouping manager 630 may be configured as or otherwise support a means for identifying a radio resource management measurement relaxation grouping to which the UE belongs based on at least one of a mobility of the UE or a location of the UE within a cell. The relaxation parameter manager 635 may be configured as or otherwise support a means for determining a first relaxation parameter from a set of multiple relaxation parameters based on a measurement relaxation criterion associated with the cell, where the set of multiple relaxation parameters are associated with the radio resource management measurement relaxation grouping. The measurement manager 640 may be configured as or otherwise support a means for performing the radio resource management measurements at a second periodicity that is based on the first relaxation parameter.

Figure 7:
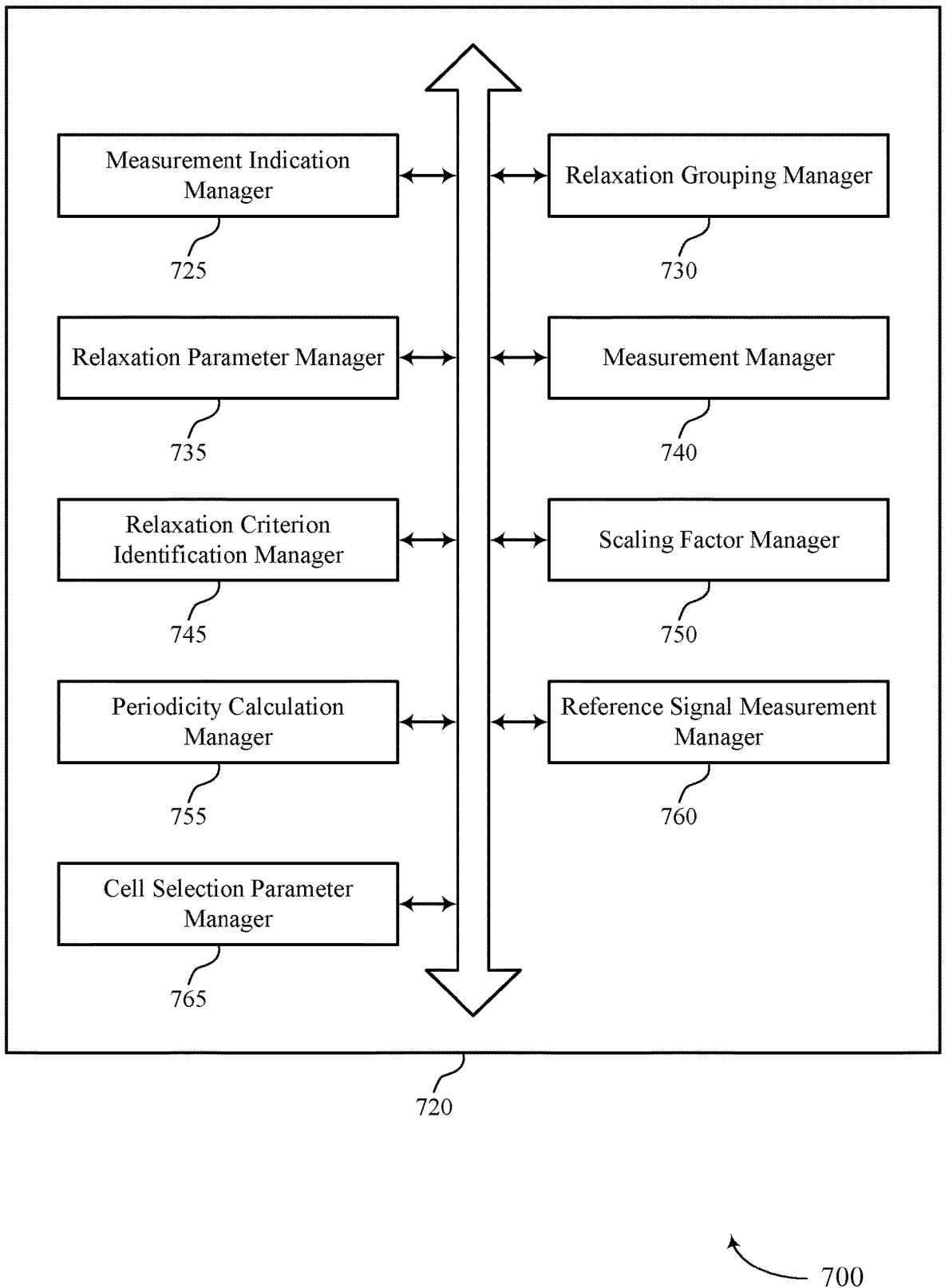
FIG. 7 shows a block diagram of a communications manager that supports techniques for performing measurement relaxation in accordance with aspects of the present disclosure.

FIG. 7 shows a block diagram 700 of a communications manager 720 that supports techniques for performing measurement relaxation in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for performing measurement relaxation as described herein. For example, the communications manager 720 may include a measurement indication manager 725, a relaxation grouping manager 730, a relaxation parameter manager 735, a measurement manager 740, a relaxation criterion identification manager 745, a scaling factor manager 750, a periodicity calculation manager 755, a reference signal measurement manager 760, a cell selection parameter manager 765, or any combination thereof. Each of these components may communicate, directly or indirectly, with one another (e.g., via one or more buses).

The communications manager 720 may support wireless communications at a UE in accordance with examples as disclosed herein. The measurement indication manager 725 may be configured as or otherwise support a means for receiving an indication that the UE is to perform radio resource management measurements at a first periodicity. The relaxation grouping manager 730 may be configured as or otherwise support a means for identifying a radio resource management measurement relaxation grouping to which the UE belongs based on at least one of a mobility of the UE or a location of the UE within a cell. The relaxation parameter manager 735 may be configured as or otherwise support a means for determining a first relaxation parameter from a set of multiple relaxation parameters based on a measurement relaxation criterion associated with the cell, where the set of multiple relaxation parameters are associated with the radio resource management measurement relaxation grouping. The measurement manager 740 may be configured as or otherwise support a means for performing the radio resource management measurements at a second periodicity that is based on the first relaxation parameter.

In some examples, the relaxation criterion identification manager 745 may be configured as or otherwise support a means for identifying the measurement relaxation criterion from a set of measurement relaxation criteria based on the radio resource management measurement relaxation grouping.

In some examples, the relaxation parameter manager 735 may be configured as or otherwise support a means for determining a second relaxation parameter from the set of multiple relaxation parameters based on satisfying the measurement relaxation criterion at a second time after a first time at which the measurement relaxation criterion was satisfied to trigger determination of the first relaxation parameter, the second relaxation parameter associated with a longer periodicity than the second periodicity.

In some examples, the measurement relaxation criterion includes a set of thresholds, each threshold of the set of thresholds is a cell selection delta threshold.

In some examples, each threshold from the set of thresholds is associated with a different multiplier to be applied to the first relaxation parameter, the second periodicity based on a multiplier.

In some examples, the set of thresholds includes at least a first threshold and a second threshold, the first threshold associated with a smaller multiplier than the second threshold.

In some examples, the set of thresholds includes an ordered list of thresholds, the UE is configured to use a first threshold at the first time and a second threshold at the second time in accordance with the ordered list of thresholds, and the first threshold is greater than the second threshold.

In some examples, the relaxation parameter manager 735 may be configured as or otherwise support a means for determining a second relaxation parameter from the set of multiple relaxation parameters based on failure to satisfy the measurement relaxation criterion at a second time after a first time at which the measurement relaxation criterion was satisfied to trigger determination of the first relaxation parameter, the second relaxation parameter associated with a shorter periodicity than the second periodicity.

In some examples, to support determining the first relaxation parameter, the scaling factor manager 750 may be configured as or otherwise support a means for determining a discrete relaxation scaling factor from a set of multiple discrete relaxation scaling factors based on the measurement relaxation criterion associated with the cell.

In some examples, to support determining the first relaxation parameter, the scaling factor manager 750 may be configured as or otherwise support a means for calculating a relaxation scaling factor in accordance with a relaxation scaling factor equation, where the relaxation scaling factor is a function of a maximum relaxation scaling factor, a cell selection reception level value, a reference cell selection reception level value, a cell selection quality value, a reference cell selection quality value, or a combination thereof.

In some examples, the scaling factor manager 750 may be configured as or otherwise support a means for receiving, from a base station, a message indicating the relaxation scaling factor equation.

In some examples, the reference cell selection reception level value and the reference cell selection quality value are associated with the radio resource management measurement relaxation grouping.

In some examples, the relaxation scaling factor equation for calculating the relaxation scaling factor is linear or non-linear.

In some examples, the relaxation scaling factor equation for calculating the relaxation scaling factor is a transform function.

In some examples, to support identifying the radio resource management measurement relaxation grouping, the relaxation grouping manager 730 may be configured as or otherwise support a means for identifying that the UE meets a set of criteria for the radio resource management measurement relaxation grouping, the radio resource management measurement relaxation grouping identified from a set of multiple radio resource management measurement relaxation groupings.

In some examples, the set of multiple radio resource management measurement relaxation groupings include a stationary and not-at-cell-edge group, a stationary group, a low-mobility and not-at-cell-edge group, a low-mobility group, and a not-at-cell-edge group.

In some examples, the periodicity calculation manager 755 may be configured as or otherwise support a means for calculating the second periodicity by multiplying the first relaxation parameter with the first periodicity.

In some examples, the relaxation grouping manager 730 may be configured as or otherwise support a means for receiving, from a base station, a message indicating a set of multiple radio resource management measurement relaxation groupings and a condition for the UE to satisfy for each of the set of multiple radio resource management measurement relaxation groupings, the condition associated with UE mobility or UE location within the cell.

In some examples, the relaxation grouping manager 730 may be configured as or otherwise support a means for receiving, from a base station, a message indicating the set of multiple relaxation parameters associated with the radio resource management measurement relaxation grouping.

In some examples, the reference signal measurement manager 760 may be configured as or otherwise support a means for measuring one or more reference signal parameters associated with the cell, the one or more reference signal parameters including reference signal received power measurements, reference signal received quality measurements, or both. In some examples, the cell selection parameter manager 765 may be configured as or otherwise support a means for calculating one or more cell selection parameters based on the one or more reference signal parameters.

In some examples, the cell selection parameter manager 765 may be configured as or otherwise support a means for comparing the one or more cell selection parameters to the measurement relaxation criterion after each of a set of multiple time intervals, where the set of multiple time intervals are uniform or non-uniform. In some examples, the cell selection parameter manager 765 may be configured as or otherwise support a means for determining that the one or more cell selection parameters satisfies the measurement relaxation criterion.

In some examples, the one or more cell selection parameters include a cell selection reception level value and a reference cell selection reception level value.

In some examples, the UE performs the radio resource management measurements in accordance with the first relaxation parameter while the UE is in a radio resource control idle or inactive state.

Figure 8:
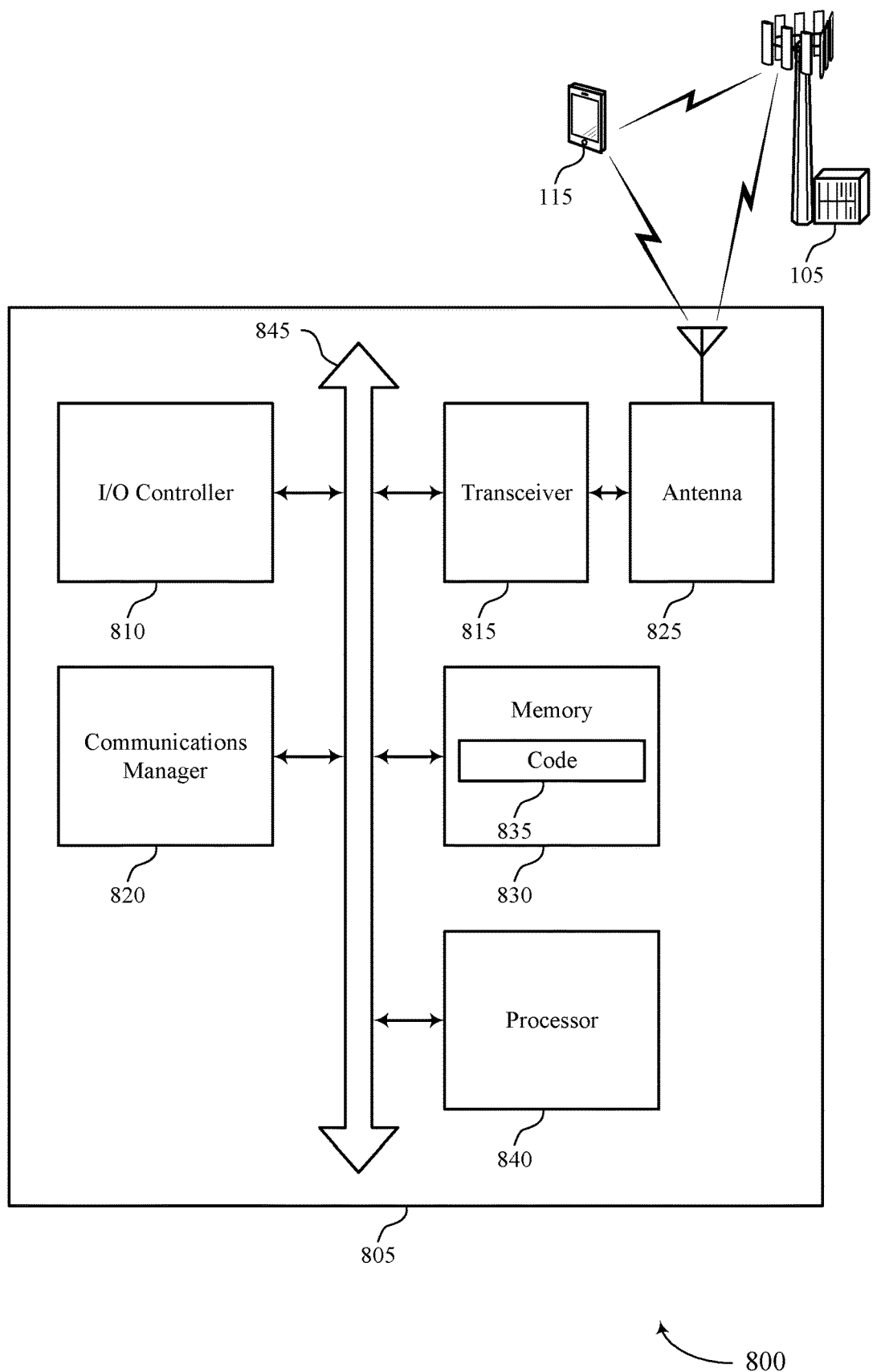
FIG. 8 shows a diagram of a system including a device that supports techniques for performing measurement relaxation in accordance with aspects of the present disclosure.

FIG. 8 shows a diagram of a system 800 including a device 805 that supports techniques for performing measurement relaxation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for performing measurement relaxation). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving an indication that the UE is to perform radio resource management measurements at a first periodicity. The communications manager 820 may be configured as or otherwise support a means for identifying a radio resource management measurement relaxation grouping to which the UE belongs based on at least one of a mobility of the UE or a location of the UE within a cell. The communications manager 820 may be configured as or otherwise support a means for determining a first relaxation parameter from a set of multiple relaxation parameters based on a measurement relaxation criterion associated with the cell, where the set of multiple relaxation parameters are associated with the radio resource management measurement relaxation grouping. The communications manager 820 may be configured as or otherwise support a means for performing the radio resource management measurements at a second periodicity that is based on the first relaxation parameter.

By including or configuring the communications manager 820 in accordance with examples as described herein, the device 805 may support techniques for improved user experience related to reduced processing, reduced power consumption, more efficient utilization of communication resources, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for performing measurement relaxation as described herein, or the processor 840 and the memory 830 may be otherwise configured to perform or support such operations.

Figure 9:
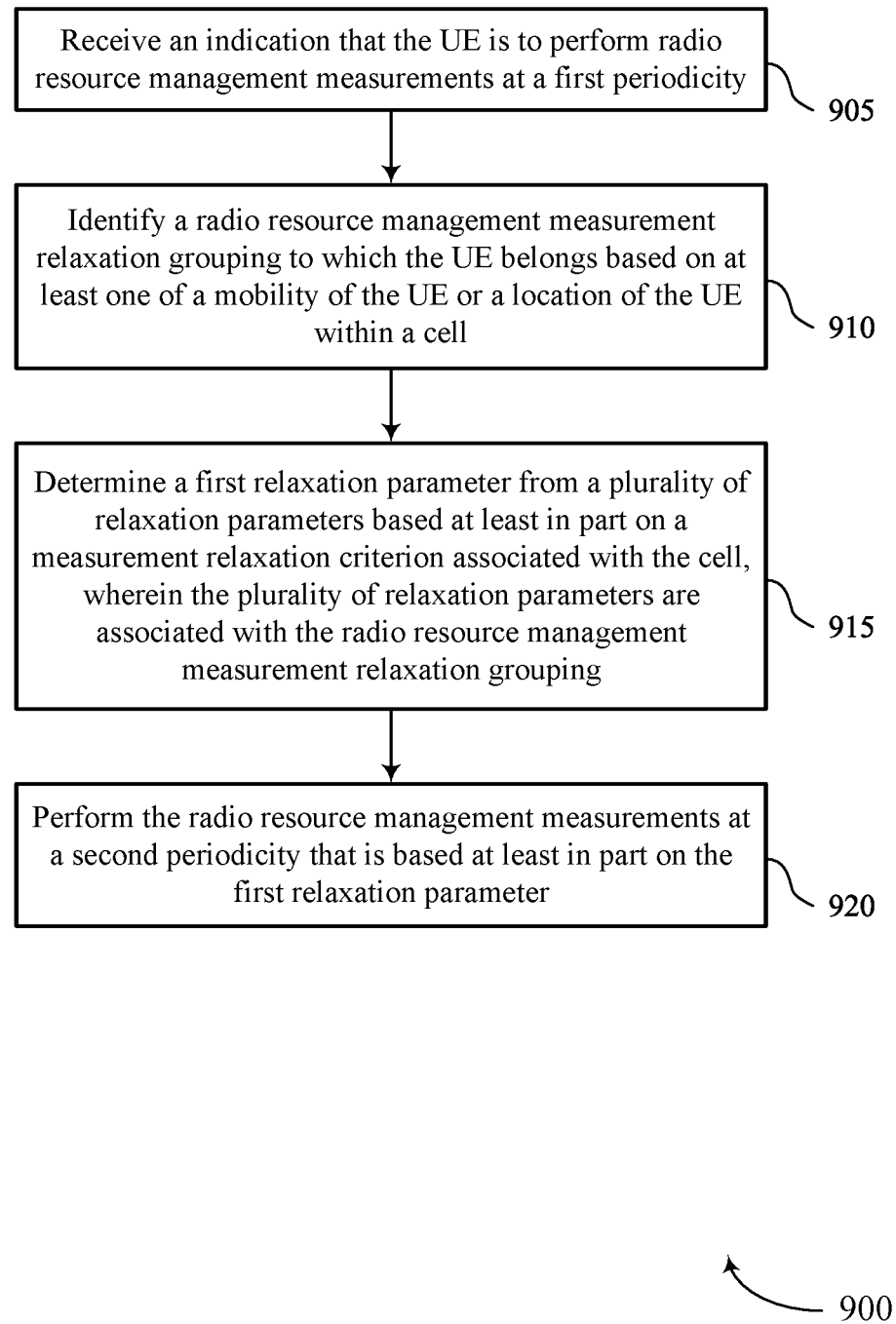
FIGS. 9 through 11 show flowcharts illustrating methods that support techniques for performing measurement relaxation in accordance with aspects of the present disclosure.

FIG. 9 shows a flowchart illustrating a method 900 that supports techniques for performing measurement relaxation in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving an indication that the UE is to perform radio resource management measurements at a first periodicity. The operations of 905 may be performed in accordance with examples as disclosed herein. In some examples, aspects of the operations of 905 may be performed by a measurement indication manager 725 as described with reference to FIG. 7.

At 910, the method may include identifying a radio resource management measurement relaxation grouping to which the UE belongs based on at least one of a mobility of the UE or a location of the UE within a cell. The operations of 910 may be performed in accordance with examples as disclosed herein. In some examples, aspects of the operations of 910 may be performed by a relaxation grouping manager 730 as described with reference to FIG. 7.

At 915, the method may include determining a first relaxation parameter from a set of multiple relaxation parameters based on a measurement relaxation criterion associated with the cell, where the set of multiple relaxation parameters are associated with the radio resource management measurement relaxation grouping. The operations of 915 may be performed in accordance with examples as disclosed herein. In some examples, aspects of the operations of 915 may be performed by a relaxation parameter manager 735 as described with reference to FIG. 7.

At 920, the method may include performing the radio resource management measurements at a second periodicity that is based on the first relaxation parameter. The operations of 920 may be performed in accordance with examples as disclosed herein. In some examples, aspects of the operations of 920 may be performed by a measurement manager 740 as described with reference to FIG. 7.

Figure 10:
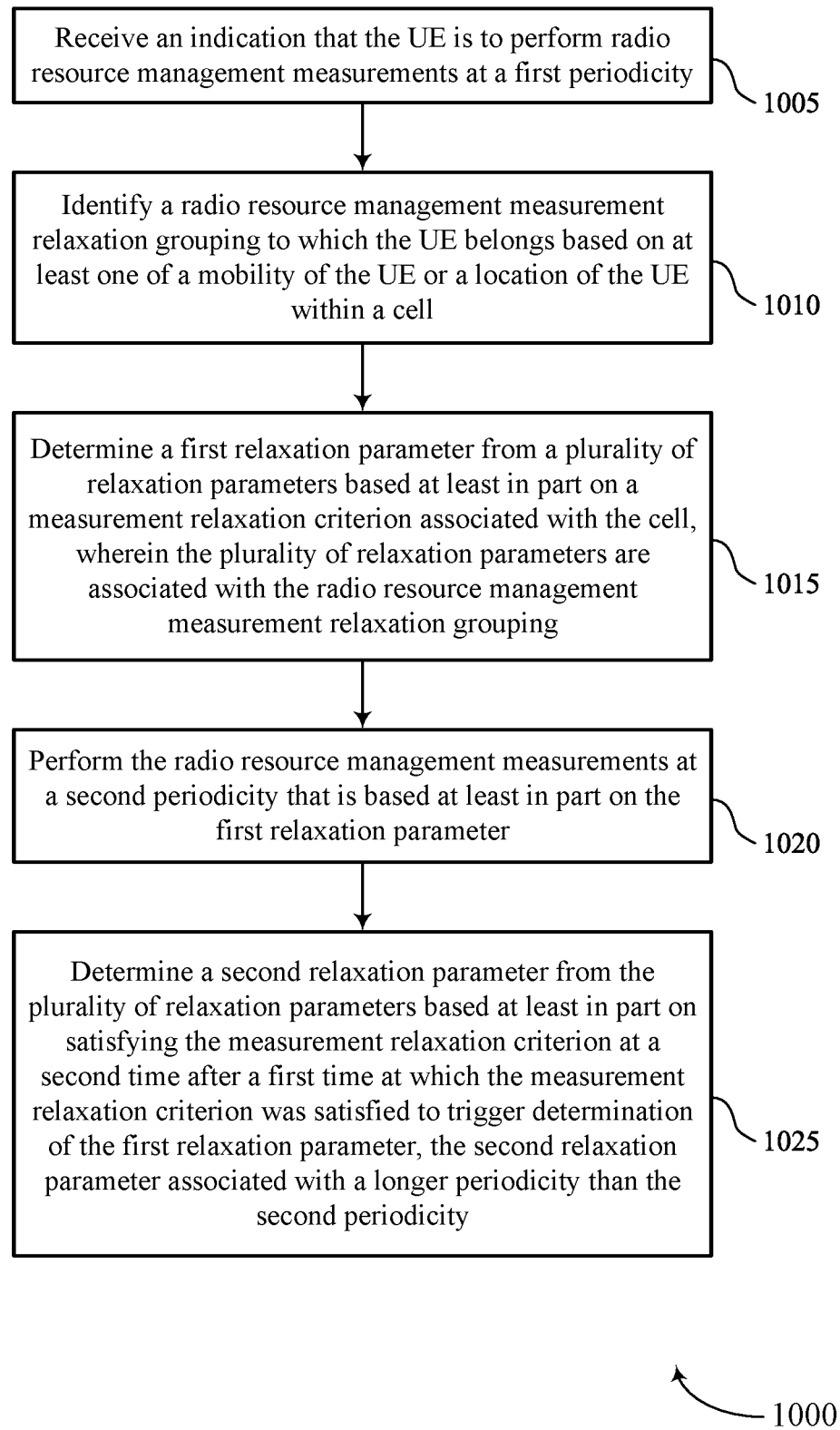

FIG. 10 shows a flowchart illustrating a method 1000 that supports techniques for performing measurement relaxation in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving an indication that the UE is to perform radio resource management measurements at a first periodicity. The operations of 1005 may be performed in accordance with examples as disclosed herein. In some examples, aspects of the operations of 1005 may be performed by a measurement indication manager 725 as described with reference to FIG. 7.

At 1010, the method may include identifying a radio resource management measurement relaxation grouping to which the UE belongs based on at least one of a mobility of the UE or a location of the UE within a cell. The operations of 1010 may be performed in accordance with examples as disclosed herein. In some examples, aspects of the operations of 1010 may be performed by a relaxation grouping manager 730 as described with reference to FIG. 7.

At 1015, the method may include determining a first relaxation parameter from a set of multiple relaxation parameters based on a measurement relaxation criterion associated with the cell, where the set of multiple relaxation parameters are associated with the radio resource management measurement relaxation grouping. The operations of 1015 may be performed in accordance with examples as disclosed herein. In some examples, aspects of the operations of 1015 may be performed by a relaxation parameter manager 735 as described with reference to FIG. 7.

At 1020, the method may include performing the radio resource management measurements at a second periodicity that is based on the first relaxation parameter. The operations of 1020 may be performed in accordance with examples as disclosed herein. In some examples, aspects of the operations of 1020 may be performed by a measurement manager 740 as described with reference to FIG. 7.

At 1025, the method may include determining a second relaxation parameter from the set of multiple relaxation parameters based on satisfying the measurement relaxation criterion at a second time after a first time at which the measurement relaxation criterion was satisfied to trigger determination of the first relaxation parameter, the second relaxation parameter associated with a longer periodicity than the second periodicity. The operations of 1025 may be performed in accordance with examples as disclosed herein. In some examples, aspects of the operations of 1025 may be performed by a relaxation parameter manager 735 as described with reference to FIG. 7.

Figure 11:
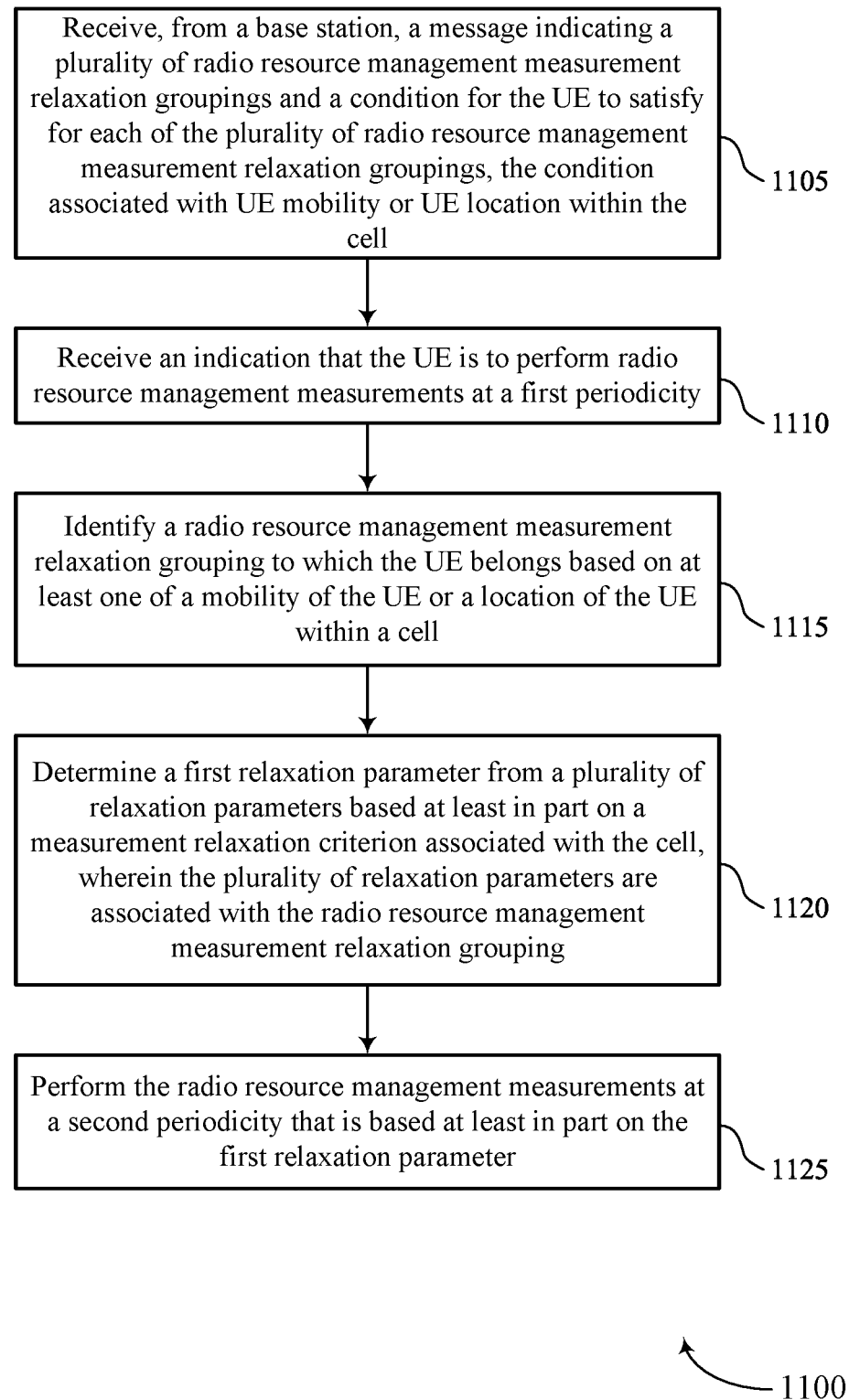

FIG. 11 shows a flowchart illustrating a method 1100 that supports techniques for performing measurement relaxation in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, a message indicating a set of multiple radio resource management measurement relaxation groupings and a condition for the UE to satisfy for each of the set of multiple radio resource management measurement relaxation groupings, the condition associated with UE mobility or UE location within the cell. The operations of 1105 may be performed in accordance with examples as disclosed herein. In some examples, aspects of the operations of 1105 may be performed by a relaxation grouping manager 730 as described with reference to FIG. 7.

At 1110, the method may include receiving an indication that the UE is to perform radio resource management measurements at a first periodicity. The operations of 1110 may be performed in accordance with examples as disclosed herein. In some examples, aspects of the operations of 1110 may be performed by a measurement indication manager 725 as described with reference to FIG. 7.

At 1115, the method may include identifying a radio resource management measurement relaxation grouping to which the UE belongs based on at least one of a mobility of the UE or a location of the UE within a cell. The operations of 1115 may be performed in accordance with examples as disclosed herein. In some examples, aspects of the operations of 1115 may be performed by a relaxation grouping manager 730 as described with reference to FIG. 7.

At 1120, the method may include determining a first relaxation parameter from a set of multiple relaxation parameters based on a measurement relaxation criterion associated with the cell, where the set of multiple relaxation parameters are associated with the radio resource management measurement relaxation grouping. The operations of 1120 may be performed in accordance with examples as disclosed herein. In some examples, aspects of the operations of 1120 may be performed by a relaxation parameter manager 735 as described with reference to FIG. 7.

At 1125, the method may include performing the radio resource management measurements at a second periodicity that is based on the first relaxation parameter. The operations of 1125 may be performed in accordance with examples as disclosed herein. In some examples, aspects of the operations of 1125 may be performed by a measurement manager 740 as described with reference to FIG. 7.

The following provides an overview of aspects of the present disclosure:

Aspect 1: A method for wireless communications at a UE, comprising: receiving an indication that the UE is to perform radio resource management measurements at a first periodicity; identifying a radio resource management measurement relaxation grouping to which the UE belongs based on at least one of a mobility of the UE or a location of the UE within a cell; determining a first relaxation parameter from a plurality of relaxation parameters based at least in part on a measurement relaxation criterion associated with the cell, wherein the plurality of relaxation parameters are associated with the radio resource management measurement relaxation grouping; and performing the radio resource management measurements at a second periodicity that is based at least in part on the first relaxation parameter.

Aspect 2: The method of aspect 1, further comprising: identifying the measurement relaxation criterion from a set of measurement relaxation criteria based at least in part on the radio resource management measurement relaxation grouping.

Aspect 3: The method of any of aspects 1 through 2, further comprising: determining a second relaxation parameter from the plurality of relaxation parameters based at least in part on satisfying the measurement relaxation criterion at a second time after a first time at which the measurement relaxation criterion was satisfied to trigger determination of the first relaxation parameter, the second relaxation parameter associated with a longer periodicity than the second periodicity.

Aspect 4: The method of aspect 3, wherein the measurement relaxation criterion comprises a set of thresholds, each threshold of the set of thresholds is a cell selection delta threshold.

Aspect 5: The method of aspect 4, wherein each threshold from the set of thresholds is associated with a different multiplier to be applied to the first relaxation parameter.

Aspect 6: The method of aspect 5, wherein the set of thresholds comprises at least a first threshold and a second threshold, the first threshold associated with a smaller multiplier than the second threshold.

Aspect 7: The method of any of aspects 4 through 6, wherein the set of thresholds comprises an ordered list of thresholds, the UE is configured to use a first threshold at the first time and a second threshold at the second time in accordance with the ordered list of thresholds, and the first threshold is greater than the second threshold.

Aspect 8: The method of any of aspects 1 through 7, further comprising: determining a second relaxation parameter from the plurality of relaxation parameters based at least in part on failure to satisfy the measurement relaxation criterion at a second time after a first time at which the measurement relaxation criterion was satisfied to trigger determination of the first relaxation parameter, the second relaxation parameter associated with a shorter periodicity than the second periodicity.

Aspect 9: The method of any of aspects 1 through 8, wherein determining the first relaxation parameter further comprises: determining a discrete relaxation scaling factor from a plurality of discrete relaxation scaling factors based at least in part on the measurement relaxation criterion associated with the cell.

Aspect 10: The method of any of aspects 1 through 9, wherein determining the first relaxation parameter further comprises: calculating a relaxation scaling factor in accordance with a relaxation scaling factor equation, wherein the relaxation scaling factor is a function of a maximum relaxation scaling factor, a cell selection reception level value, a reference cell selection reception level value, a cell selection quality value, a reference cell selection quality value, or a combination thereof.

Aspect 11: The method of aspect 10, further comprising: receiving, from a base station, a message indicating the relaxation scaling factor equation.

Aspect 12: The method of any of aspects 10 through 11, wherein the reference cell selection reception level value and the reference cell selection quality value are associated with the radio resource management measurement relaxation grouping.

Aspect 13: The method of any of aspects 10 through 12, wherein the relaxation scaling factor equation for calculating the relaxation scaling factor is linear or non-linear.

Aspect 14: The method of any of aspects 10 through 13, wherein the relaxation scaling factor equation for calculating the relaxation scaling factor is a transform function.

Aspect 15: The method of any of aspects 1 through 14, wherein identifying the radio resource management measurement relaxation grouping further comprises: identifying that the UE meets a set of criteria for the radio resource management measurement relaxation grouping, the radio resource management measurement relaxation grouping identified from a plurality of radio resource management measurement relaxation groupings.

Aspect 16: The method of aspect 15, wherein the plurality of radio resource management measurement relaxation groupings comprise a stationary and not-at-cell-edge group, a stationary group, a low-mobility and not-at-cell-edge group, a low-mobility group, and a not-at-cell-edge group.

Aspect 17: The method of any of aspects 1 through 16, further comprising: calculating the second periodicity by multiplying the first relaxation parameter with the first periodicity.

Aspect 18: The method of any of aspects 1 through 17, further comprising: receiving, from a base station, a message indicating a plurality of radio resource management measurement relaxation groupings and a condition for the UE to satisfy for each of the plurality of radio resource management measurement relaxation groupings, the condition associated with UE mobility or UE location within the cell.

Aspect 19: The method of any of aspects 1 through 18, further comprising: receiving, from a base station, a message indicating the plurality of relaxation parameters associated with the radio resource management measurement relaxation grouping.

Aspect 20: The method of any of aspects 1 through 19, further comprising: measuring one or more reference signal parameters associated with the cell, the one or more reference signal parameters comprising reference signal received power measurements, reference signal received quality measurements, or both; and calculating one or more cell selection parameters based at least in part on the one or more reference signal parameters.

Aspect 21: The method of aspect 20, further comprising: comparing the one or more cell selection parameters to the measurement relaxation criterion after each of a plurality of time intervals, wherein the plurality of time intervals are uniform or non-uniform; and determining that the one or more cell selection parameters satisfies the measurement relaxation criterion.

Aspect 22: The method of any of aspects 20 through 21, wherein the one or more cell selection parameters comprise a cell selection reception level value and a reference cell selection reception level value.

Aspect 23: The method of any of aspects 1 through 22, wherein the UE performs the radio resource management measurements in accordance with the first relaxation parameter while the UE is in a radio resource control idle or inactive state.

Aspect 24: An apparatus for wireless communications, comprising a processor; memory coupled with the processor; and instructions stored in the memory and executable by the processor to cause the apparatus to perform a method of any of aspects 1 through 23.

Aspect 25: An apparatus for wireless communications, comprising at least one means for performing a method of any of aspects 1 through 23.

Aspect 26: A non-transitory computer-readable medium storing code for wireless communications, the code comprising instructions executable by a processor to perform a method of any of aspects 1 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving an indication that the UE is to perform radio resource management measurements at a first periodicity;
   identifying, from a plurality of radio resource management measurement relaxation groupings, a radio resource management measurement relaxation grouping to which the UE belongs based on at least one of a mobility of the UE or a location of the UE within a cell;

determining a first relaxation parameter from a plurality of relaxation parameters based at least in part on a measurement relaxation criterion associated with the cell, wherein each of the plurality of radio resource management measurement relaxation groupings is associated with a respective relaxation parameter of the plurality of relaxation parameters, and wherein the measurement relaxation criterion is based at least in part on a duration during which the UE belongs to the radio resource management measurement relaxation grouping; and performing the radio resource management measurements at a second periodicity that is based at least in part on the first relaxation parameter.

2. The method of claim 1, further comprising:
identifying the measurement relaxation criterion from a set of measurement relaxation criteria based at least in part on the radio resource management measurement relaxation grouping.

3. The method of claim 1, further comprising:
determining a second relaxation parameter from the plurality of relaxation parameters based at least in part on satisfying the measurement relaxation criterion at a second time after a first time at which the measurement relaxation criterion was satisfied to trigger determination of the first relaxation parameter, the second relaxation parameter associated with a longer periodicity than the second periodicity.

4. The method of claim 3, wherein the measurement relaxation criterion comprises a set of thresholds, each threshold of the set of thresholds is a cell selection delta threshold.

5. The method of claim 4, wherein each threshold from the set of thresholds is associated with a different multiplier to be applied to the first relaxation parameter.

6. The method of claim 5, wherein the set of thresholds comprises at least a first threshold and a second threshold, the first threshold associated with a smaller multiplier than the second threshold.

7. The method of claim 4, wherein the set of thresholds comprises an ordered list of thresholds, the UE is configured to use a first threshold at the first time and a second threshold at the second time in accordance with the ordered list of thresholds, and the first threshold is greater than the second threshold.

8. The method of claim 1, further comprising:
determining a second relaxation parameter from the plurality of relaxation parameters based at least in part on failure to satisfy the measurement relaxation criterion at a second time after a first time at which the measurement relaxation criterion was satisfied to trigger determination of the first relaxation parameter, the second relaxation parameter associated with a shorter periodicity than the second periodicity.

9. The method of claim 1, wherein determining the first relaxation parameter further comprises:
determining a discrete relaxation scaling factor from a plurality of discrete relaxation scaling factors based at least in part on the measurement relaxation criterion associated with the cell.

10. The method of claim 1, wherein determining the first relaxation parameter further comprises:
calculating a relaxation scaling factor in accordance with a relaxation scaling factor equation, wherein the relaxation scaling factor is a function of a maximum relaxation scaling factor, a cell selection reception level value, a reference cell selection reception level value, a cell selection quality value, a reference cell selection quality value, or a combination thereof.

11. The method of claim 10, further comprising:
receiving, from a base station, a message indicating the relaxation scaling factor equation.

12. The method of claim 10, wherein the reference cell selection reception level value and the reference cell selection quality value are associated with the radio resource management measurement relaxation grouping.

13. The method of claim 10, wherein the relaxation scaling factor equation for calculating the relaxation scaling factor is linear or non-linear.

14. The method of claim 10, wherein the relaxation scaling factor equation for calculating the relaxation scaling factor is a transform function.

15. The method of claim 1, wherein identifying the radio resource management measurement relaxation grouping further comprises:
identifying that the UE meets a set of criteria for the radio resource management measurement relaxation grouping, the radio resource management measurement relaxation grouping identified from the plurality of radio resource management measurement relaxation groupings.

16. The method of claim 15, wherein the plurality of radio resource management measurement relaxation groupings comprise a stationary and not-at-cell-edge group, a stationary group, a low-mobility and not-at-cell-edge group, a low-mobility group, and a not-at-cell-edge group.

17. The method of claim 1, further comprising:
calculating the second periodicity by multiplying the first relaxation parameter with the first periodicity.

18. The method of claim 1, further comprising:
receiving, from a base station, a message indicating the plurality of radio resource management measurement relaxation groupings and a condition for the UE to satisfy for each of the plurality of radio resource management measurement relaxation groupings, the condition associated with UE mobility or UE location within the cell.

19. The method of claim 1, further comprising:
receiving, from a base station, a message indicating the plurality of relaxation parameters associated with the radio resource management measurement relaxation grouping.

20. The method of claim 1, further comprising:
measuring one or more reference signal parameters associated with the cell, the one or more reference signal parameters comprising reference signal received power measurements, reference signal received quality measurements, or both; and
calculating one or more cell selection parameters based at least in part on the one or more reference signal parameters.

21. The method of claim 20, further comprising:
comparing the one or more cell selection parameters to the measurement relaxation criterion after each of a plurality of time intervals, wherein the plurality of time intervals are uniform or non-uniform; and
determining that the one or more cell selection parameters satisfies the measurement relaxation criterion.

22. The method of claim 20, wherein the one or more cell selection parameters comprise a cell selection reception level value and a reference cell selection reception level value.

23. The method of claim 1, wherein the UE performs the radio resource management measurements in accordance with the first relaxation parameter while the UE is in a radio resource control idle or inactive state.

24. An apparatus for wireless communications, comprising:
  a processor;
  memory coupled with the processor; and
  instructions stored in the memory and executable by the processor to cause the apparatus to:
    receive an indication that a user equipment (UE) is to perform radio resource management measurements at a first periodicity;
    identify, from a plurality of radio resource management measurement relaxation groupings, a radio resource management measurement relaxation grouping to which the UE belongs based on at least one of a mobility of the UE or a location of the UE within a cell;
    determine a first relaxation parameter from a plurality of relaxation parameters based at least in part on a measurement relaxation criterion associated with the cell, wherein each of the plurality of radio resource management measurement relaxation groupings is associated with a respective relaxation parameter of the plurality of relaxation parameters, and wherein the measurement relaxation criterion is based at least in part on a duration during which the UE belongs to the radio resource management measurement relaxation grouping; and
    perform the radio resource management measurements at a second periodicity that is based at least in part on the first relaxation parameter.

25. The apparatus of claim 24, wherein the instructions are further executable by the processor to cause the apparatus to:
  identify the measurement relaxation criterion from a set of measurement relaxation criteria based at least in part on the radio resource management measurement relaxation grouping.

26. The apparatus of claim 24, wherein the instructions are further executable by the processor to cause the apparatus to:
  determine a second relaxation parameter from the plurality of relaxation parameters based at least in part on satisfying the measurement relaxation criterion at a second time after a first time at which the measurement relaxation criterion was satisfied to trigger determination of the first relaxation parameter, the second relaxation parameter associated with a longer periodicity than the second periodicity.

27. The apparatus of claim 24, wherein the instructions are further executable by the processor to cause the apparatus to:
  determine a second relaxation parameter from the plurality of relaxation parameters based at least in part on failure to satisfy the measurement relaxation criterion at a second time after a first time at which the measurement relaxation criterion was satisfied to trigger determination of the first relaxation parameter, the second relaxation parameter associated with a shorter periodicity than the second periodicity.

28. The apparatus of claim 24, wherein the instructions to determine the first relaxation parameter are further executable by the processor to cause the apparatus to:
  determine a discrete relaxation scaling factor from a plurality of discrete relaxation scaling factors based at least in part on the measurement relaxation criterion associated with the cell.

29. An apparatus for wireless communications, comprising:
  means for receiving an indication that a user equipment (UE) is to perform radio resource management measurements at a first periodicity;
  means for identifying, from a plurality of radio resource management measurement relaxation groupings, a radio resource management measurement relaxation grouping to which the UE belongs based on at least one of a mobility of the UE or a location of the UE within a cell;
  means for determining a first relaxation parameter from a plurality of relaxation parameters based at least in part on a measurement relaxation criterion associated with the cell, wherein each of the plurality of radio resource management measurement relaxation groupings is associated with a respective relaxation parameter of the plurality of relaxation parameters, and wherein the measurement relaxation criterion is based at least in part on a duration during which the UE belongs to the radio resource management measurement relaxation grouping; and
  means for performing the radio resource management measurements at a second periodicity that is based at least in part on the first relaxation parameter.

30. A non-transitory computer-readable medium storing code for wireless communications, the code comprising instructions executable by a processor to:
  receive an indication that a user equipment (UE) is to perform radio resource management measurements at a first periodicity;
  identify, from a plurality of radio resource management measurement relaxation groupings, a radio resource management measurement relaxation grouping to which the UE belongs based on at least one of a mobility of the UE or a location of the UE within a cell;
  determine a first relaxation parameter from a plurality of relaxation parameters based at least in part on a measurement relaxation criterion associated with the cell, wherein each of the plurality of radio resource management measurement relaxation groupings is associated with a respective relaxation parameter of the plurality of relaxation parameters, and wherein the measurement relaxation criterion is based at least in part on a duration during which the UE belongs to the radio resource management measurement relaxation grouping; and
  perform the radio resource management measurements at a second periodicity that is based at least in part on the first relaxation parameter.

* * * * *